US009286240B1

(12) United States Patent
Kuzmenko

(10) Patent No.: US 9,286,240 B1
(45) Date of Patent: Mar. 15, 2016

(54) SYSTEMS AND METHODS FOR CONTROLLING ACCESS TO CONTENT IN A DISTRIBUTED COMPUTERIZED INFRASTRUCTURE FOR ESTABLISHING A SOCIAL NETWORK

(71) Applicant: Anchorfree, Inc., Mountain View, CA (US)

(72) Inventor: Roman Kuzmenko, Mountain View, CA (US)

(73) Assignee: Anchorfree, Inc., Menlo Park, CA (US)

( * ) Notice: Subject to any disclaimer, the term of this patent is extended or adjusted under 35 U.S.C. 154(b) by 55 days.

(21) Appl. No.: 13/757,868

(22) Filed: Feb. 4, 2013

(51) Int. Cl.
G06F 11/30 (2006.01)
G06F 12/14 (2006.01)

(52) U.S. Cl.
CPC .................................. *G06F 12/1408* (2013.01)

(58) Field of Classification Search
CPC ....................................................... H04L 29/06
USPC .......................................................... 713/193
See application file for complete search history.

(56) References Cited

U.S. PATENT DOCUMENTS

2008/0154775 A1* 6/2008 Soukup ............................ 705/51
2013/0173916 A1* 7/2013 Sato ............................... 713/165
2013/0275752 A1* 10/2013 Zhang et al. ................... 713/167

* cited by examiner

*Primary Examiner* — Mohammad W Reza
(74) *Attorney, Agent, or Firm* — TransPacific Law Group; Pavel I. Pogodin, Esq.

(57) ABSTRACT

A computer-implemented method for storing content, the stored content being accessible by a computerized system comprising at least one central processing unit, memory, storage system and a network interface unit, computerized system being accessible by a user, the method comprising: generating first cryptographic key; encrypting the content with the first cryptographic key; storing the encrypted content in a data storage system, the data storage system comprising at least one data storage medium; a data storage controller and a network interface module, the data storage system being a part of a cloud-based distributed storage system, the cloud based storage system being connected via a data network with computerized system accessible by the user; generating a second cryptographic key; and re-encrypting the content with the second cryptographic key and storing the re-encrypted content in data storage system, wherein the re-encryption of the content is performed within cloud-based distributed storage system.

14 Claims, 20 Drawing Sheets

SYSTEMS AND METHODS FOR CONTROLLING ACCESS TO CONTENT IN A DISTRIBUTED COMPUTERIZED INFRASTRUCTURE FOR ESTABLISHING A SOCIAL NETWORK

BACKGROUND OF THE INVENTION

1. Field of the Invention

This invention relates in general to social networking and, more particularly, to providing systems and methods for enabling a distributed computerized infrastructure for establishing a social network.

2. Description of the Related Art

As it would be appreciated by persons of skill in the art, there exist many types of social networking applications, including Facebook, Google Plus, as well as many others. All such applications are build around a centralized social networking service which stores all user data and enables social interaction between users. As it would be appreciated by those of skill in the art, the centralized service model has certain disadvantages, one of them being inability of the users to control the storing and use of their private information by the social networking service. For example, if the aforesaid personal data storage is subject to a malicious attack, personal data of all users may become compromised at once.

In addition, the centralized data storage system creates a single point of failure capable of bringing down the entire social network. Therefore, there is a need for systems and methods that enable a distributed computerized infrastructure for establishing a social network between users and provide users with the freedom to exercise control over storage and distribution of their personal information.

SUMMARY OF THE INVENTION

The inventive methodology is directed to methods and systems that substantially obviate one or more of the above and other problems associated with conventional techniques for enabling social online interaction between users.

In accordance with one aspect of the present invention, there is provided a computer-implemented method for storing a content, the stored content being accessible by a computerized system comprising at least one central processing unit, a memory, a storage system and a network interface unit, the computerized system being accessible by a user, the method comprising: generating a first cryptographic key; encrypting the content with the first cryptographic key; storing the encrypted content in a data storage system, the data storage system comprising at least one data storage medium; a data storage controller and a network interface module, the data storage system being a part of a cloud-based distributed storage system, the cloud based storage system being connected via a data network with the computerized system accessible by the user; generating a second cryptographic key; and re-encrypting the content with the second cryptographic key and storing the re-encrypted content in the data storage system, wherein the re-encryption of the content is performed within the cloud-based distributed storage system.

In accordance with another aspect of the present invention, there is provided a computerized content storage system for storing a content, the stored content being accessible by a computerized system comprising at least one central processing unit, a memory, a storage system and a network interface unit, the computerized system being accessible by a user, the computerized content storage system comprising: key generation module for generating a first cryptographic key and a second cryptographic key; encryption module for encrypting the content with the first cryptographic key; and a data storage system for storing the encrypted content, the data storage system comprising at least one data storage medium; a data storage controller and a network interface module, the data storage system being a part of a cloud-based distributed storage system, the cloud based storage system being connected via a data network with the computerized system accessible by the user, wherein the encryption module is configured to re-encrypt the content with the second cryptographic key and cause the re-encrypted content to be stored in the data storage system, wherein the encryption module is located within the cloud based storage system.

In accordance with yet another aspect of the present invention, there is provided a tangible computer-readable medium embodying a set of computer-readable instructions, which, when executed by one or more processors cause the one or more processors to perform a computer-implemented method for storing a content, the stored content being accessible by a computerized system comprising at least one central processing unit, a memory, a storage system and a network interface unit, the computerized system being accessible by a user, the method comprising: generating a first cryptographic key; encrypting the content with the first cryptographic key; storing the encrypted content in a data storage system, the data storage system comprising at least one data storage medium; a data storage controller and a network interface module, the data storage system being a part of a cloud-based distributed storage system, the cloud based storage system being connected via a data network with the computerized system accessible by the user; generating a second cryptographic key; and re-encrypting the content with the second cryptographic key and storing the re-encrypted content in the data storage system, wherein the re-encryption of the content is performed within the cloud-based distributed storage system.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Aspects of the present invention provide systems and methods for enabling a distributed computerized infrastructure for establishing a social network between users. Specifically, aspects of the invention provide various technology and/or software solutions for people (end users) to engage in social networking activities without providing a social network as a centralized service. In addition, the described systems and methods provide users with the freedom to have control over storage and distribution of their personal information.

In one or more embodiments, the inventive social network infrastructure is based on content, which is stored in diverse information storage locations, which are determined by the owner of the information. Specifically, in one or more embodiments, the same information may be stored in two or more information storage locations are the same time. In one or more embodiments, the user who owns the information himself or herself stores (locally or online) the encryption/decryption keys and storage location addresses (for example URLs), which are required to access his friends'/contacts' data.

In one or more embodiments, the invention provides a user interface for accessing the stored personal information across all diverse storage locations. In various embodiments of the invention, such user interface may be based on a thick client implementation, such as one using Java graphical user interface (GUI), thin client implementation, such as a web-based user interface similar to web icq, well known to persons of ordinary skill in the art, or even an application running on an existing network.

Various specific components of the inventive distributed computerized infrastructure for establishing a social network will now be described in detail.

Personal Key Based Security

Figure 1:
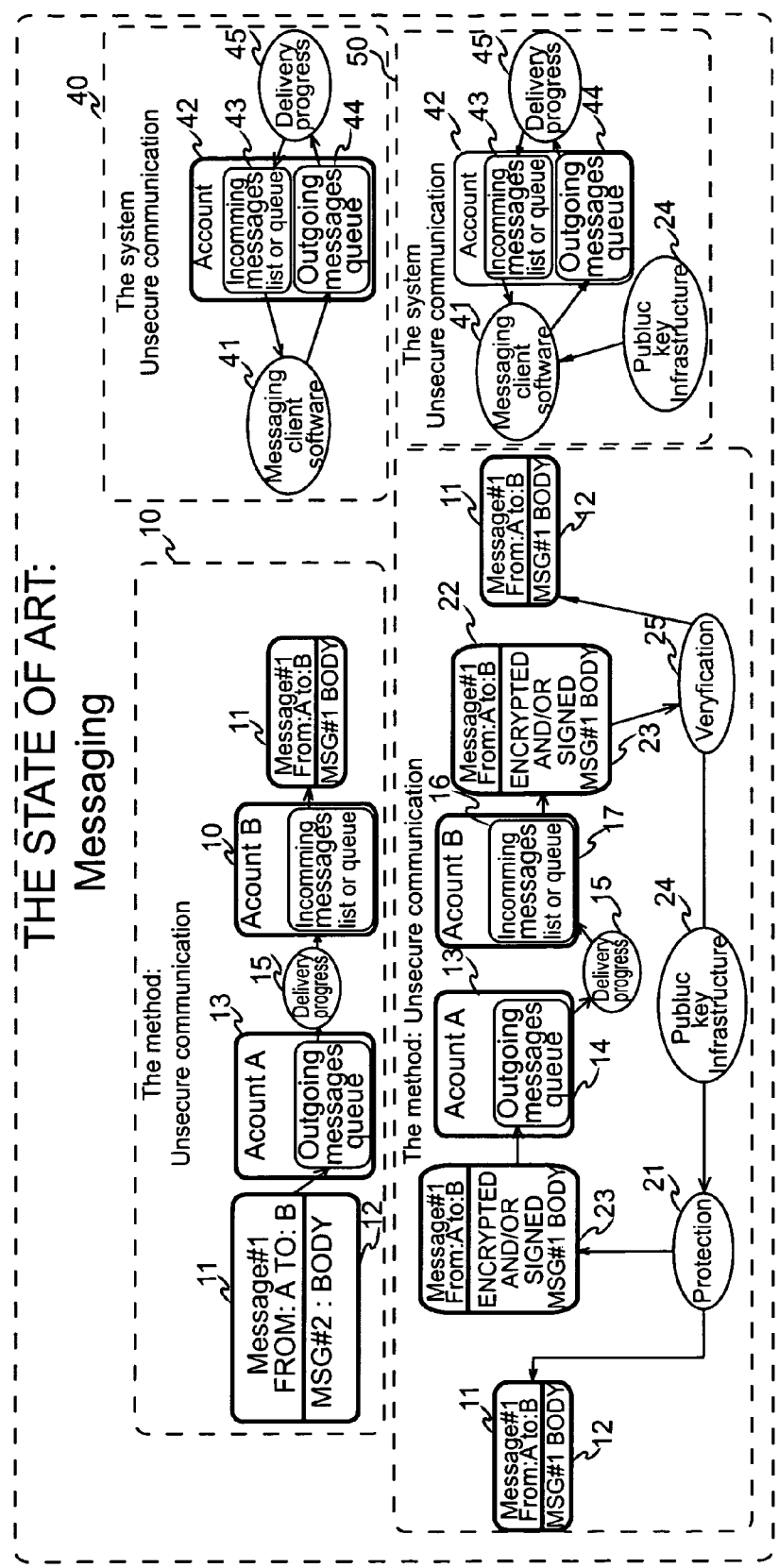
FIG. 1 illustrates an exemplary embodiment of an unsecure message communication method and an exemplary messaging system for implementing the described communication method.

FIG. 1 illustrates an exemplary embodiment of an unsecure message communication method 10. The message 13 including a message body 12 is placed into an outgoing message queue 14 associated with user account 13. The message is subsequently delivered (15) to an incoming message list or queue 17 of the receiving user's account 16. Another embodiment of the messaging method 20 shown in FIG. 1 additionally includes message protection step 21, which generates a protected message 22 having encrypted and/or signed message body 23, which is then placed into the outgoing message queue 14. Upon the receipt by the other party, the message is verified at step 25. Public key infrastructure well known to persons of ordinary skill in the art may be used for the aforesaid protection and verification steps.

FIG. 1 also shows an exemplary messaging system 40 for implementing the described communication method 10. The system 40 deployed by both parties to the messaging process includes messaging client software 41 configured to place messages into outgoing message queue 44 of the user account 42 and retrieve messages from incoming message queue 43. The messages are sent and received by the message delivery process 45.

Finally, an exemplary messaging system 50, also shown in FIG. 1, implements the described communication method 20. In addition to all the components of the messaging system 40, the messaging system 50 additionally includes the public key infrastructure 24 designed to support message protection and verification.

Figure 2:
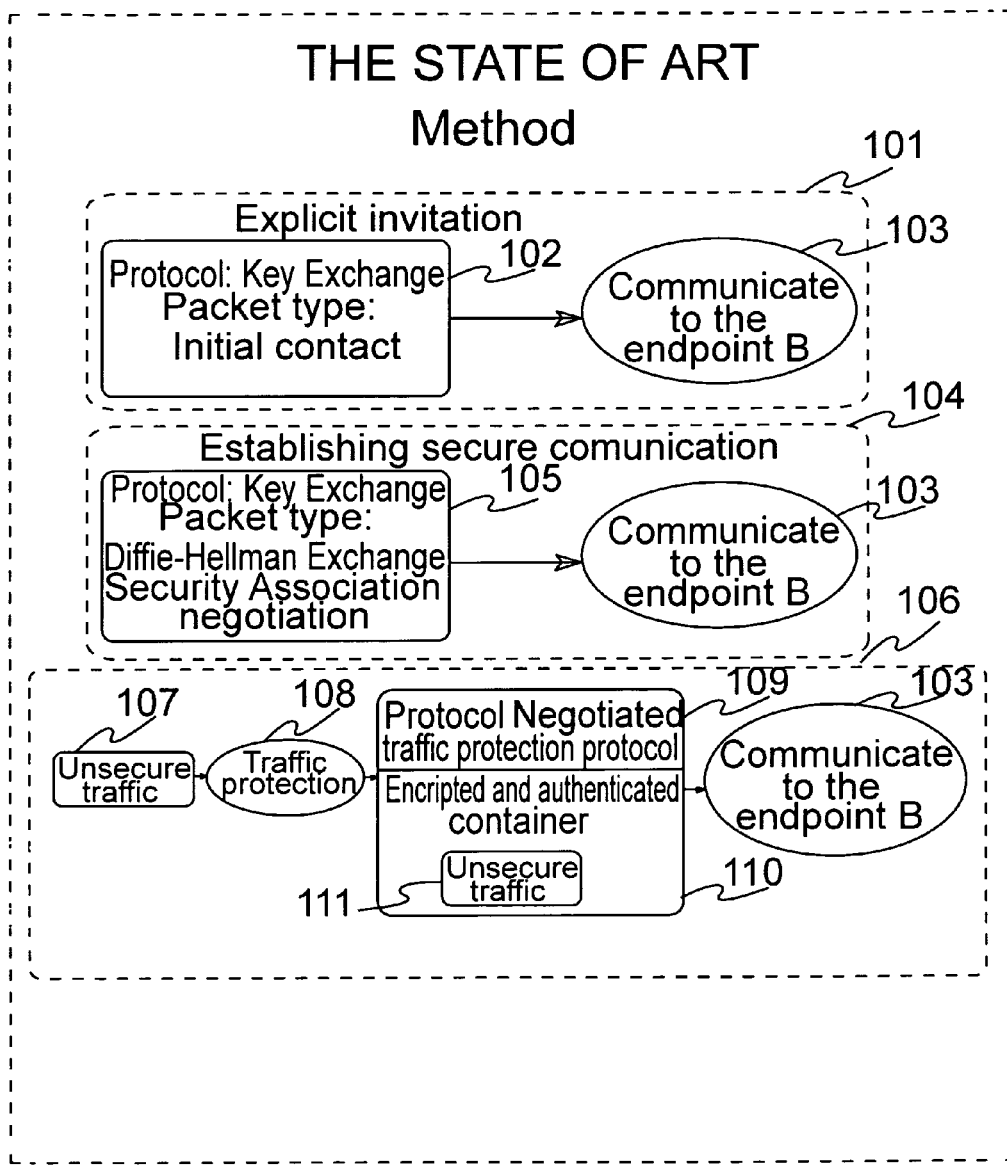
FIG. 2 illustrates an exemplary method for achieving a secure communication between endpoint A and endpoint B.

As it would be appreciated by those of skill in the art, in order to secure communications between two endpoints using encryption, encryption/decryption keys must first be exchanged between them. FIG. 2 illustrates an exemplary method for achieving a secure communication between endpoint A and endpoint B.

First, at step 101, the endpoint A sends an initial invitation 102 to participate in key exchange and negotiation of the security association to the endpoint B 103. At step 104, the endpoint A performs Diffie-Hellman key exchange 105 with endpoint B and negotiates the security association attributes, which may include the cryptographic algorithm and mode; traffic encryption key; and parameters for the network data to be passed over the connection. Subsequently, at step 106, the secure communication between endpoint A and endpoint B is established. Specifically, unsecure traffic 107 is protected at 108 using negotiated secure traffic protection protocol 109, which encapsulates the unsecure traffic 111 into an encrypted and authenticated container 110.

Figure 3:
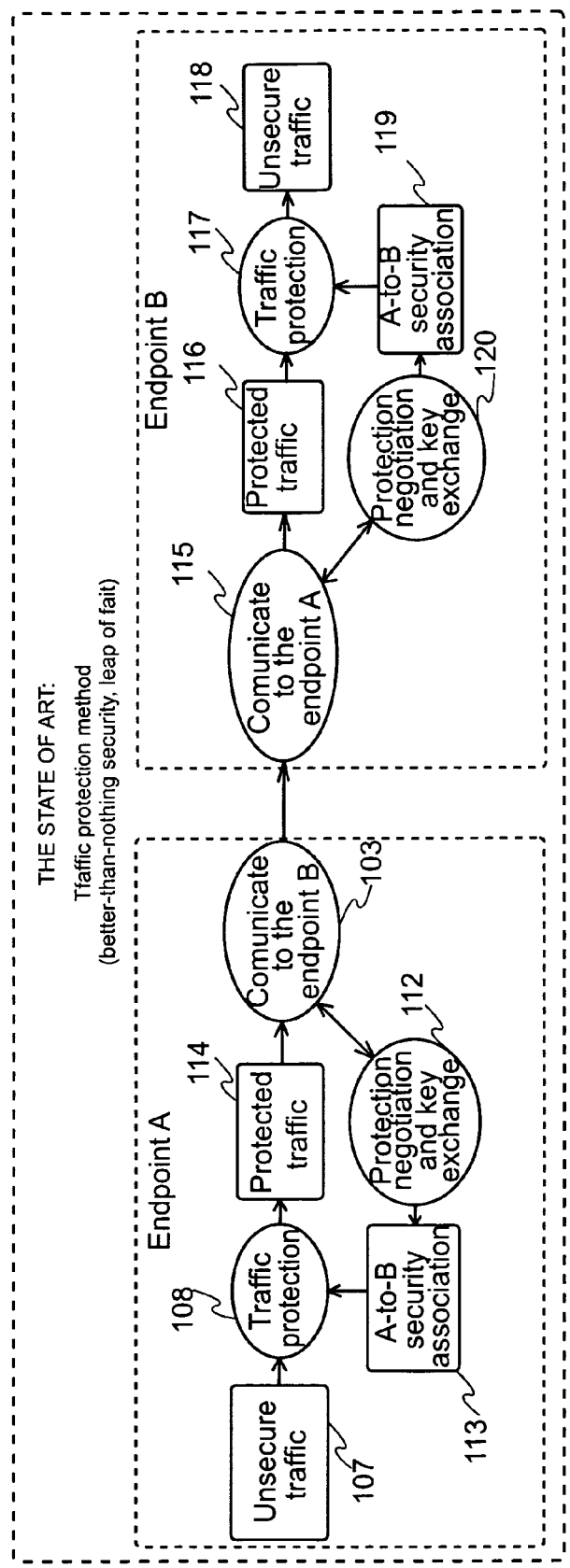
FIG. 3 illustrates an exemplary embodiment of a traffic protection method also known as "better-than-nothing security" or "leap of faith."

FIG. 3 illustrates an exemplary embodiment of a traffic protection method also known as "better-than-nothing security" or "leap of faith." Specifically, unsecure traffic 107 is protected at step 108 using security association attributes 113 negotiated during the security association negotiation and key exchange step 112 between endpoint A and endpoint B. The protected traffic 114 is communicated from endpoint A to endpoint B, see step 103. At the endpoint B side, the encrypted traffic is received at step 115. The protected traffic 116 is then decrypted at step 117 using security association attributes 119 negotiated during the security association negotiation and key exchange step 120 between endpoint A and endpoint B, which results in unencrypted traffic 118.

Figure 4:
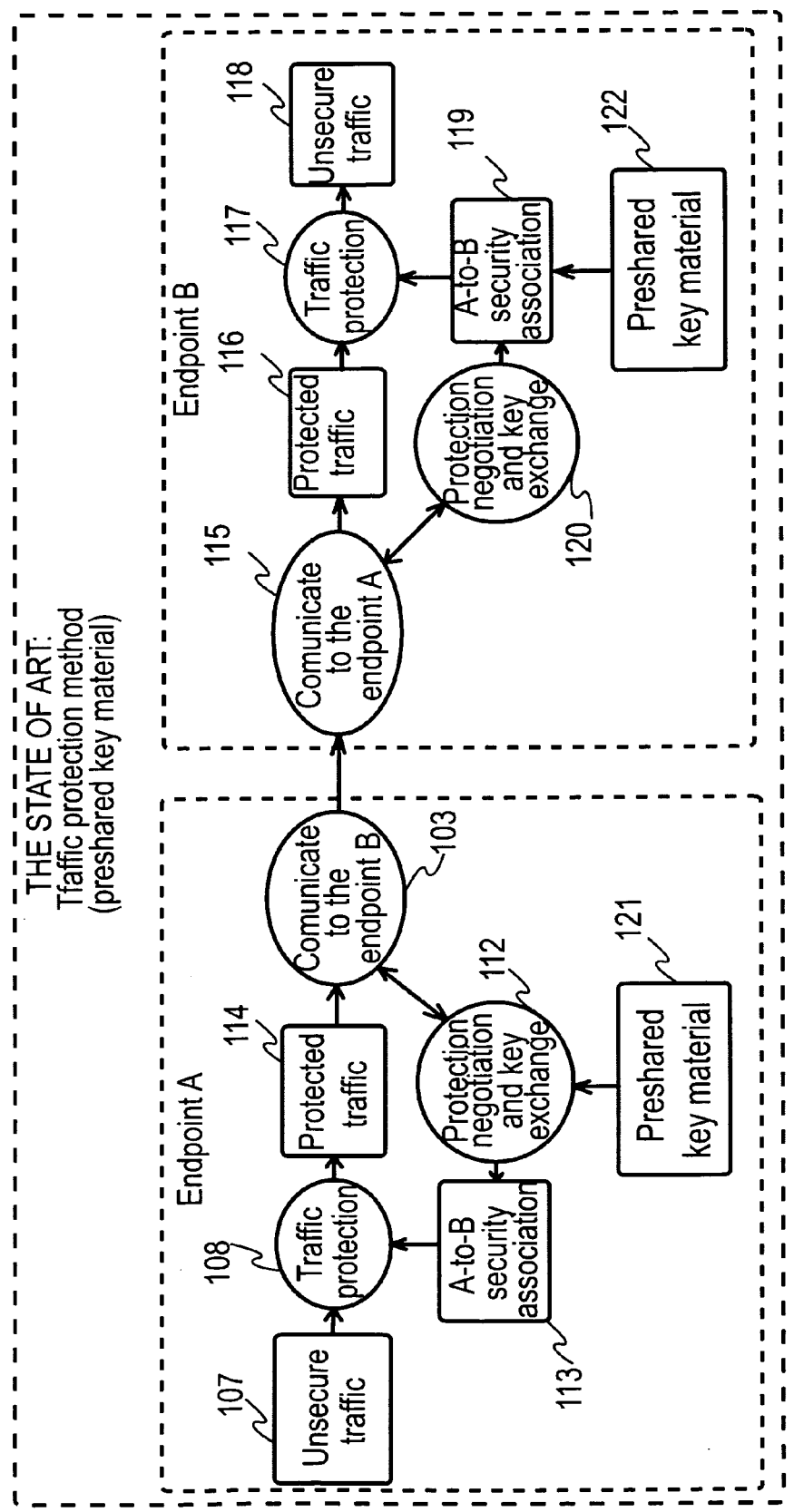
FIG. 4 depicts an exemplary embodiment of a traffic protection method based on a key material pre-shared between endpoint A and endpoint B.

In accordance with the conventional encryption key exchange technology, key material may be exchanged between two or more endpoints using bidirectional protocol and protocol-specific identifiers/addresses. The keys are used later to secure the data communication channel between those endpoints using those specific addresses. An illustrative FIG. 4 depicts an exemplary embodiment of a traffic protection method based on a key material pre-shared between endpoint A and endpoint B. The aforesaid method relies on pre-shared key material 121 (at endpoint A) and 122 (at endpoint B) used for encrypting and decrypting the traffic between the respective endpoints.

Figure 5:
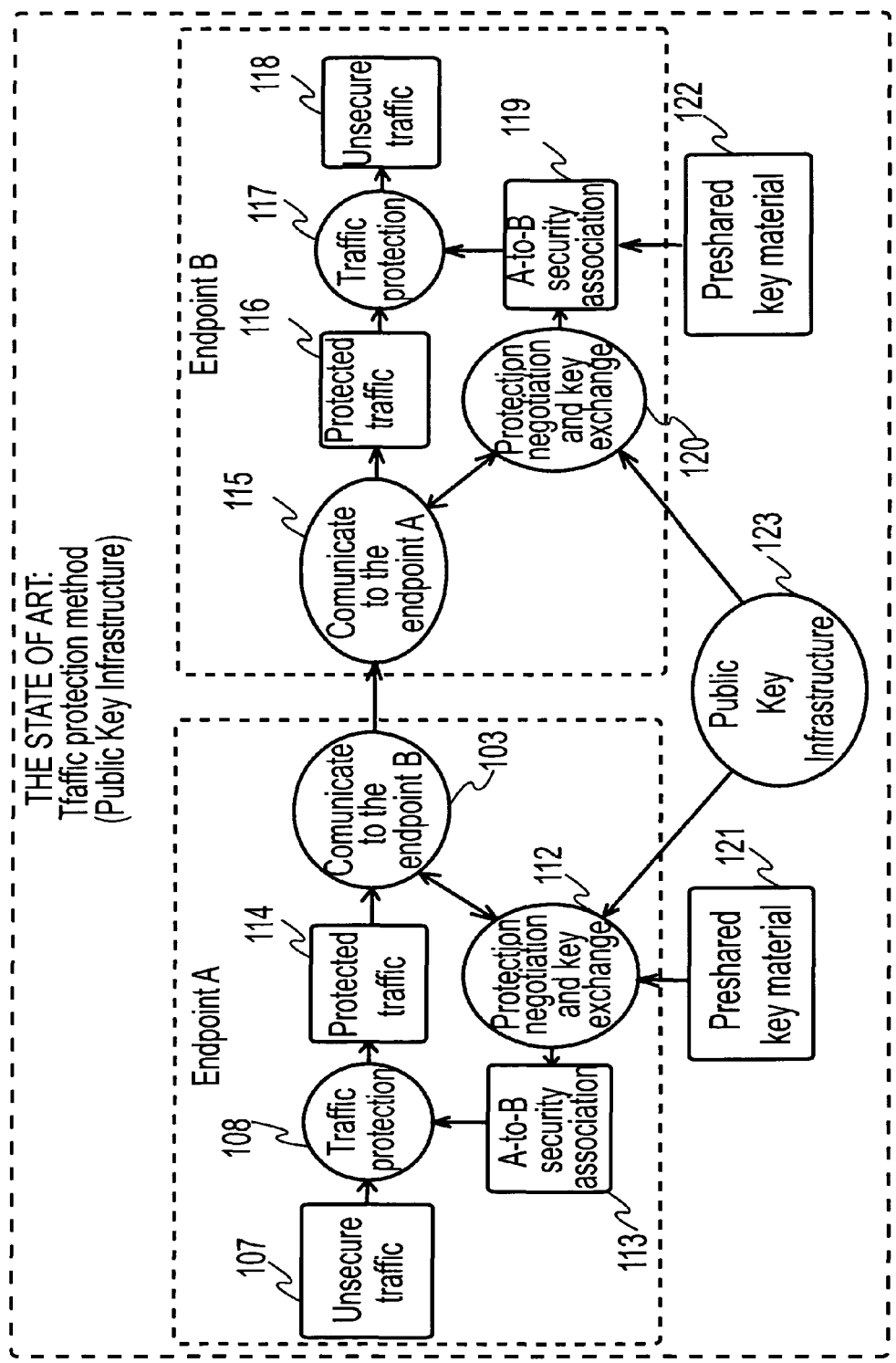
FIG. 5 depicts an exemplary embodiment of a traffic protection method based on public key infrastructure.

In an alternative implementation, a public key infrastructure may be used for securing communication between points A and B. Specifically, FIG. 5 depicts an exemplary embodiment of a traffic protection method based on public key infrastructure 123, well-known to persons of ordinary skill in the art. The aforesaid method relies on public key infrastructure 123 for encrypting and decrypting the traffic between the respective endpoints.

In accordance with one or more embodiments of the invention, there is provided a computer-implemented method, as well as an associated computerized system implementing such method, for secure communication (confidential and/or authenticated) between two or more users. An embodiment of the inventive method utilizes any communication layer with any properties including, without limitation, unidirectional or bidirectional communications, based on the key material having been exchanged beforehand. The aforesaid key exchange may be performed offline, for example in-person or via trustful and/or public mediators or via networking or other communication layer by assuming a trustfulness of a certain protocol-specific user identifier, including, without limitation, an e-mail address, IM account name, or the like.

In one or more embodiments, a secure association is created using trustful means or by a leap of faith (for instance, assuming that only the person you want to communicate with has access to certain e-mail address) but the rekeying is performed by using different message exchange systems, which can vary over time and from time to time. One or more exchange channels (communication channels, message-based or other exchange systems) can be used at the same time to assure that the peer party controls all of those communication endpoints.

A system may (or may not) implement an abstraction layer which hides away the control and/or key exchanges messages from the users view or provides some visualization that helps the users to identify the purpose and/or content of these messages. A system may (or may not) generate new or transform existing communication messages in order to invite the peer party to join secure communication or to trigger automatic key exchange and a creation of a security association with or without a manual approval from the receiving person.

Figure 6:
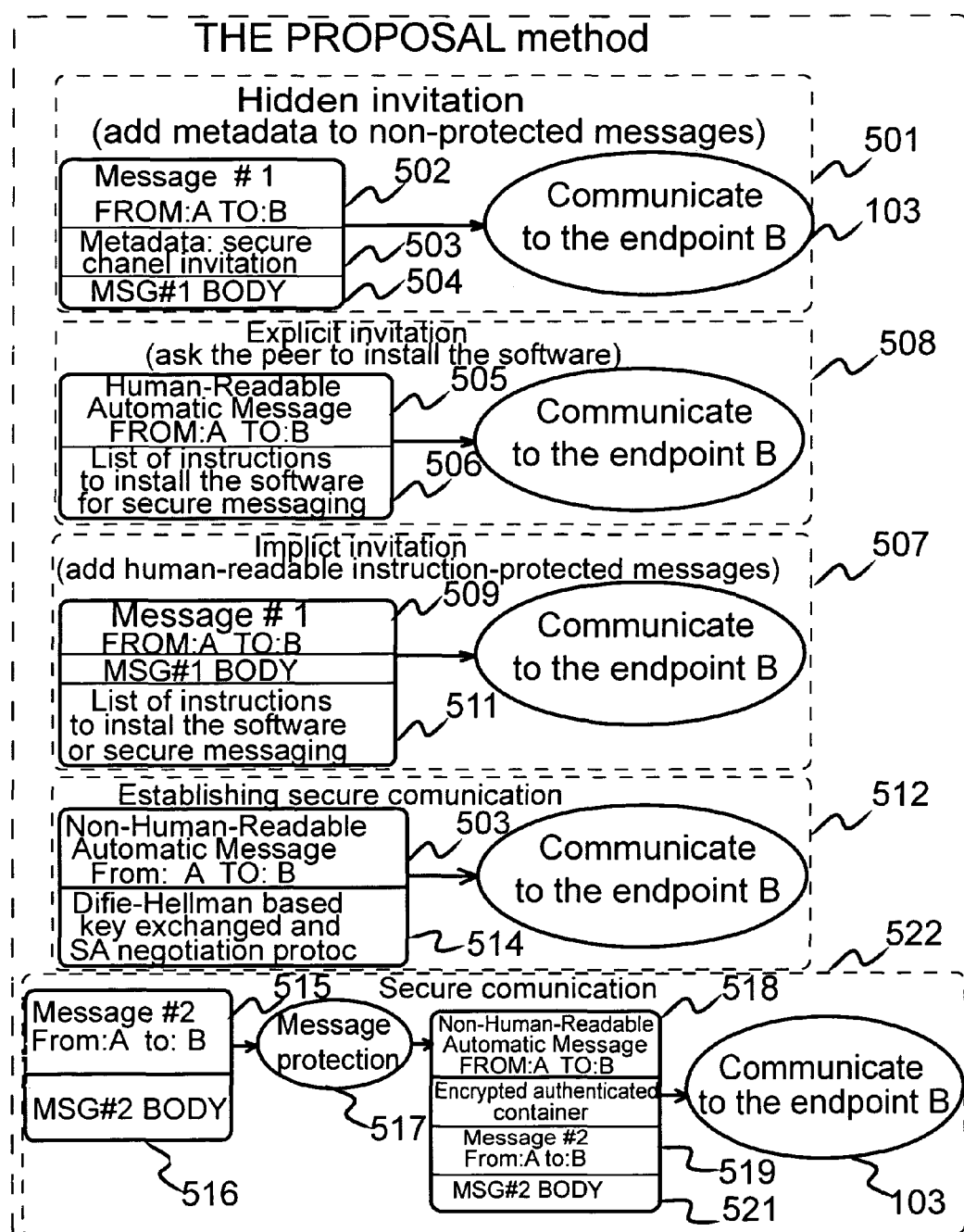
FIG. 6 illustrates certain exemplary embodiments of the inventive secure communication methods.

FIG. 6 illustrates certain exemplary embodiments of the inventive secure communication methods. In exemplary method 501, illustrated in that figure, endpoint A sends initial message 502 to endpoint B. The message 502 incorporates hidden metadata for secure channel invitation 503 in addition to the non-protected message body 504. In method 508, endpoint A sends an explicit invitation to endpoint B requesting the party to install specific messaging software. The message 505 sent by the endpoint A to endpoint B may be in a human-readable form and contain a list of human-readable instructions 506 for installing software for secure messaging.

In exemplary method 507, the initial message 509 may contain an implicit invitation to establish secure communication by adding human-readable instructions to non-protected messages. Specifically, message 509 may include list of human-readable instructions 511 in addition to the message body 510. Finally, the secure communication session may be established using key exchange protocols as well as security association negotiation well known to persons of ordinary skill in the art, see exemplary method 512. In this exemplary implementation, the initial message may be a non-human readable automatic message 513 having a component 514 formatted in accordance with, for example, Diffie-Hellman key exchange protocol and security association negotiation protocol.

In one or more embodiments, after the secure communication 522 is established in accordance with exemplary methods described above, subsequent messages 515 containing message body 516 are protected at step 517 thereby being transformed into a form of non-human readable automatic messages 518 having an encrypted and authenticated container 519 encapsulating the original message 520 and the corresponding message body 521. The resulting secured messages are sent to the endpoint B, see step 103 in FIG. 6.

Figure 7:
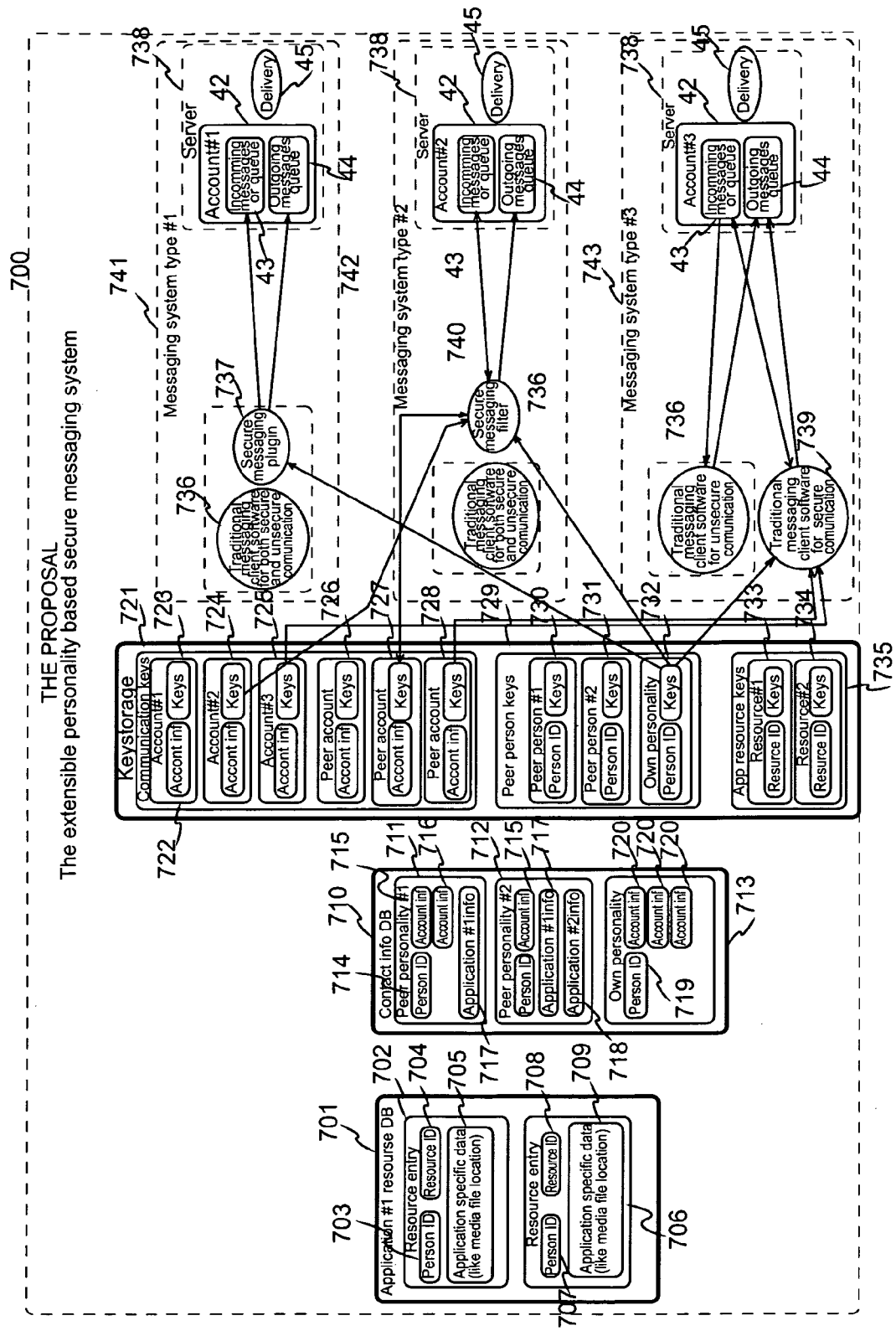
FIG. 7 illustrates an exemplary embodiment of inventive extensible personality-based secure messaging system.

FIG. 7 illustrates an exemplary embodiment of inventive extensible personality-based secure messaging system 700. In the shown exemplary embodiment, user is able to invite peer parties to join secure communication. In one or more embodiments, the user is able to register the personality of the peer parties public keys if such keys have been exchanged between user offline or by other means. In one or more embodiments, the user is enabled to make a leap of faith by accepting the public key used to sign and encrypt certain messages (whose authorship may be subject to doubt) and associating it with certain (or new) personality.

Turning now to FIG. 7, the system includes application resource database 701 configured to store resource entries 702 and 706. The aforesaid resource entries 702 and 706 incorporate resource identifier 704 and 708, personality identifier 703 and 707, and application-specific data 705 and 709. The application specific data 705 may have a nature of media file location or rating value and may additionally include constraints such ex expiration date.

In one or more embodiments, the system 700 further includes contact information database 710 storing peer personality records 711 and 712 and own personality record 713. The peer personality records 711 and 712 include peer personality IDs 714, account information 715 and 716 as well as application information 717 and 718. The own personality record 713 includes own personality ID 718 and account information records 720.

In one or more embodiments, the system 700 also incorporates key storage 721 storing communication channel keys 722, peer personalities keys 729 and application resource keys 735. The communication channel keys 722 include keys associated with accounts 723, 724 and 725 as well as keys associated with peer accounts from messaging subsystem 726, 727 and 728. Peer personality keys 729 include keys associated with peer personalities 730, 731 and 732. Finally, the application resource keys 735 include keys associated with resources 733 and 734.

In one or more embodiments, the client side of the system further includes traditional messaging client software 736 operating solely or in conjunction with secure messaging plugin 737 or secure messaging network filter 740. In one or more embodiments, traditional or specific messaging client software 739 for secure communication may be provided. The described client system communicates with the server 738 incorporating client accounts and message queues described above.

In one or more embodiments, exemplary messaging subsystem 741 incorporates client software 736, which is extensible by plugins, such as plugin 737. The exemplary messaging subsystem 742 provides functionality for changing the message on the network level by means of the secure messaging network filter 740. Finally, in the exemplary messaging subsystem 743 two clients 736 and 739 may co-exist with one another.

Personal Content Key Storage

In one or more embodiments, the key storage 721 described above facilitates storing all content and other keys distributed by other users or systems as well as, optionally, storing the locations and addresses required to access that content. In one or more embodiments, the keys may be stored in clear as well as using user's password and/or personal or other key(s). In one or more embodiments, the key storage system 721 may (or may not) facilitate easy and/or structured access to the information protected by the stored keys. In one or more embodiments, the key storage system 721 may (or may not) group the content or content keys by PI or personal keys of the owner/author/publisher. In one or more embodiments, the key storage 721 may (or may not) automatically replace the content keys when the content is re-encrypted (see above) and/or new key material is distributed using personal digital rights management system (DRM) described hereinbelow or some other means.

Personal Digital Rights Management (DRM)

In accordance with conventional social networking technology, personal information of a social network user may be published online in an unencrypted form making it accessible to the entire public. In an alternative configuration, the personal information may be encrypted with a symmetric or an asymmetric key and the aforesaid cryptographic key may be distributed to a list of intended recipients or providers. In this situation, only the recipients in the possession of the proper cryptographic key would have access to the information in an unencrypted form. In a configuration using a symmetric key, the same key is used for both encryption and decryption of the personal information. In the configuration using asymmetric key cryptography, only a public key is shared with the other party, while the private key is never shared. Information is encrypted with the shared public key and decrypted with the private key. Thus, the asymmetric key method protects against situation when the key is compromised during the sharing process.

In accordance with one or more embodiments of the invention, there is provided a computer-implemented method, as well as a computerized system implementing such method, configured to protect personal information or other content being stored at any specific offline or online storage location, including, without limitation, a hosting service or a cloud service. In one or more embodiments, the stored information is protected using one or more dynamically generated cryptographic keys. In one or more embodiments, a new key or a set of keys are periodically generated and the content is periodically re-encrypted using the newly generated keys. In one or more embodiments, the re-encryption may be performed on demand or at randomly generated times. When specific information is re-encrypted, the old encryption key stops being usable for accessing the unencrypted information. Thus, the re-encryption with a new key operates as expiration of the old encryption key with respect to the encrypted information.

In one or more embodiments, the same content may be stored in several different copies encrypted with different keys at the same time. Each copy would be re-encrypted at different time, making the corresponding encryption keys expire in different times. The content may be stored in several copies enabling access using several keys at the same time (to implement graceful key expiration as well as to implement several access points which can be revoked independently).

Personal DRM Online Agent

As it would be appreciated by persons of skill in the art, there exist online data storage systems and methods with data encryption during data storage or data transmit operations. In existing systems, the data encryption key does not change for the user or the data unit.

In accordance with one or more embodiments of the invention, there is provided a method and an associated system implementing such method, configured to re-encrypt data periodically at fixed, variable or specific moments of time. Such system may operate on the user-controlled/owned devices as well as on a system which runs autonomously or has network or other connectivity to the data storage when the user/owner is offline or has no connectivity to the data storage for one or another reason at the moment when the operation (re-encryption) takes place. In particular, such system may operate on the same system/network where the encrypted data is stored. Such system may generate new keys itself, receive them from the user/owner/publisher, from a trusted or a user-selected/specified or some other source. Such system may deliver the generated/received keys to the user/owner/publisher and/or any user specified destinations (for example, a group of people who are granted with access to this content).

Figure 8:
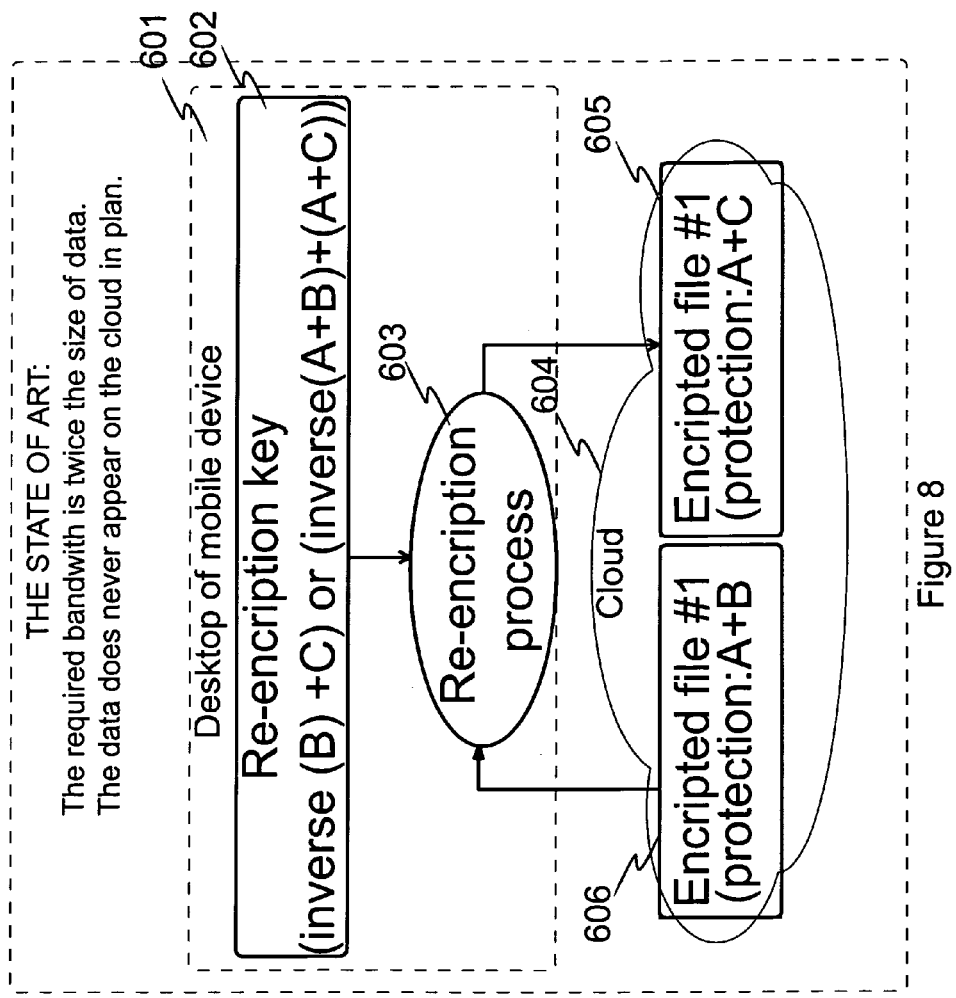
FIG. 8 illustrates an exemplary embodiment of the re-encryption process.

FIG. 8 illustrates an exemplary embodiment of the re-encryption process. In the embodiment shown in FIG. 8, the generation of the re-encryption key 602 and the re-encryption process 603 itself both take place on the desktop or mobile device 601. Two versions of the same file 605 and 606 are being stored in a cloud storage system 604 and are being encrypted with different keys. It should be noted that because of the multiple (two) encryption copies stored in the cloud storage system and the fact that the encryption takes place on the local computing device, the connection bandwidth required for such a system is twice the size of the stored copy of data. In the configuration shown in FIG. 6, the data never appears in the cloud in a plain (unencrypted) form.

Figure 9:
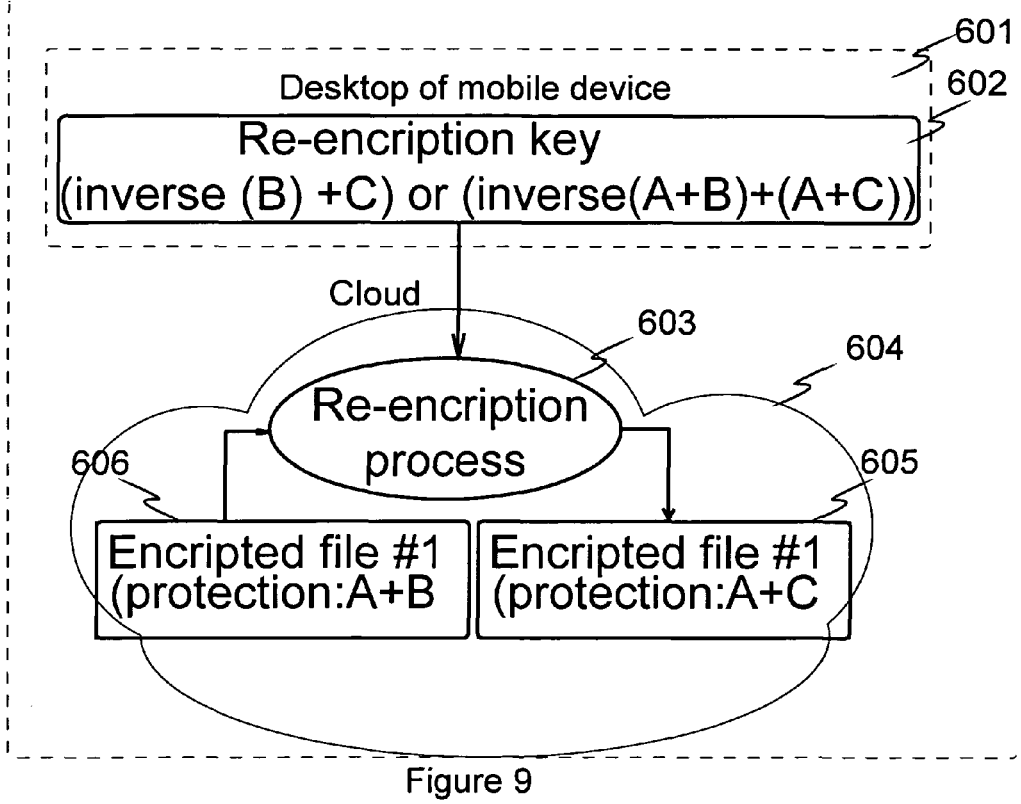
FIG. 9 illustrates another exemplary embodiment of the re-encryption process.

In the re-encryption configuration shown in FIG. 9, the re-encryption process 603 is moved to the cloud 604. For this reason, only the encryption key needs to be transferred between the cloud and the device 601. This reduces the bandwidth demand to only the size of the encryption key. In the configuration shown in FIG. 9, the data may or may not appear in the cloud 604 in a plain (unencrypted) form.

In one or more embodiments, the keys to access the content are automatically or manually distributed to the required recipients. The keys may (or may not) be distributed in plain, obfuscated or protected by personal keys (see above) or be any other keys. The keys may (or may not) be retrieved on demand by the party trying to access the content. The system may (or may not) check the peer party eligibility/right for accessing this content.

Figure 10:
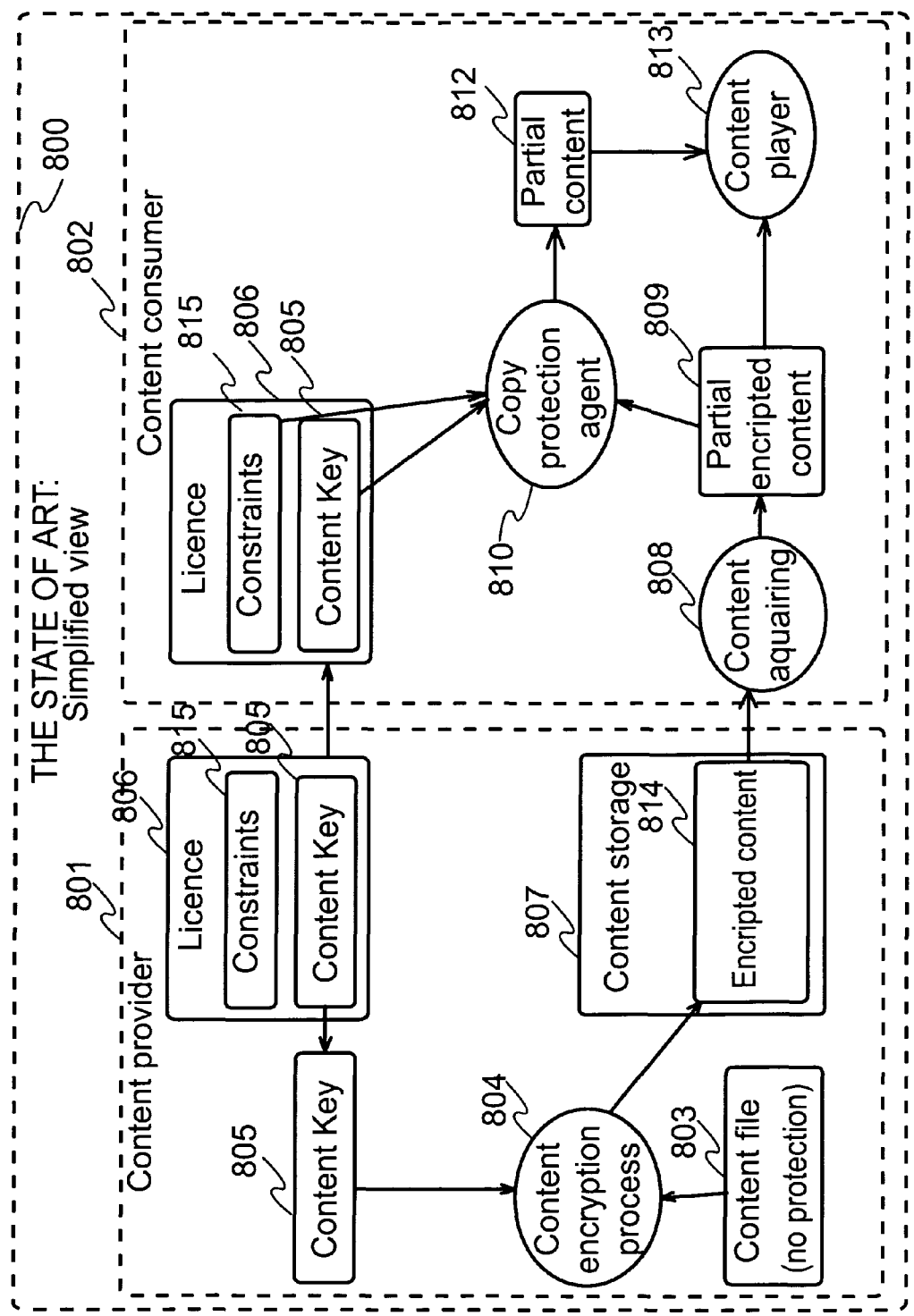
FIG. 10 illustrates an exemplary embodiment of a digital rights management (DRM) system.

FIG. 10 illustrates an exemplary embodiment of a digital rights management (DRM) system 800. At the content provider side 801, the unprotected content file 803 is encrypted at step 804 using a content key 805. The encrypted content 814 is stored in a content storage 807. The content key 805, which is used in the aforesaid content encryption process, is part of the license 806, which additionally includes pre-determined constraints (limitations) 815 on using the content subject to DRM. The foresaid constraints may be specified by the provider of the content.

In one or more embodiments, on the content consumer side 802, the partially encrypted content 809 is acquired from the content provider at 808. The copy protection agent 810 verifies the compliance with the constraints 815 of the license 806 and decrypts the content using the content key 805. Partial content 812 is subsequently played or otherwise presented to the user using the content player 813. It should be noted that for purposes of conserving system resources, in one or more embodiments, only a portion of the content is being encrypted, such that the content is not usable by the user without the encrypted portion. In an alternative embodiment, the entire content may be encrypted.

Figure 11:
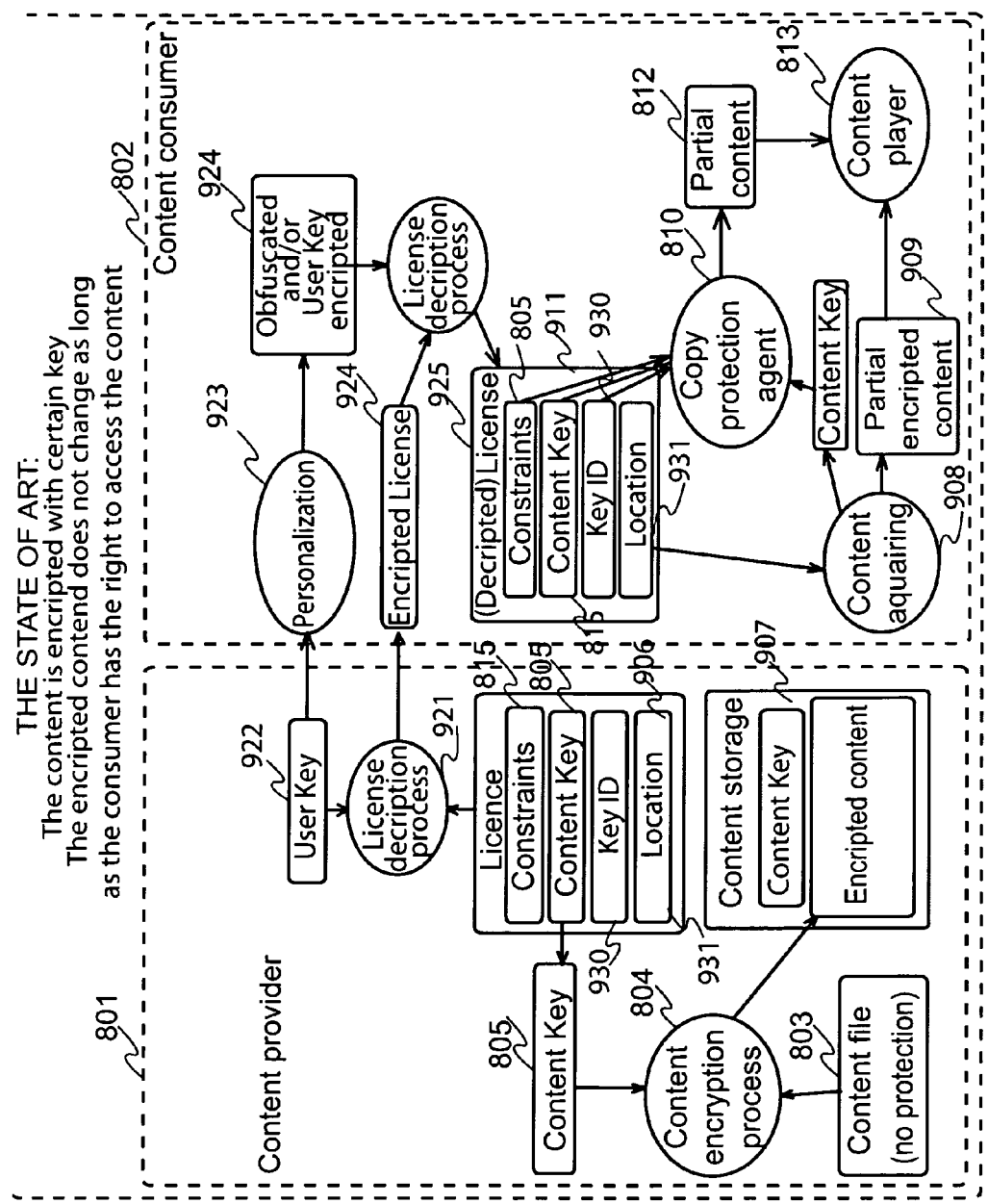
FIG. 11 illustrates another exemplary embodiment of a digital rights management (DRM) system.

FIG. 11 illustrates another exemplary embodiment of a digital rights management (DRM) system 900. In the embodiments shown in FIG. 11, the content may be included using multiple different keys and, accordingly, the content license 906 additionally includes content key identifier (key ID) parameter 930 as well as location parameter 931. The content key ID may be stored in the content storage 907 together with the content in order to identify the key that is being used for encrypting the content. The content location parameter 931 is used for acquiring content at step 908. The content key may accompany the encrypted content 909 in order to identify the proper key for decryption of the content by the copy protection agent 810.

In addition, the system 900 may also include an optional process 940 involving license encryption step 921 based on user key 922. The encrypted license 925 is sent to the content consumer 802, where it is decrypted at step 926. Finally, for security reasons, the user key that is being used for license encryption and decryption is itself encrypted or otherwise obfuscated using steps 923 and 924.

Figure 12:
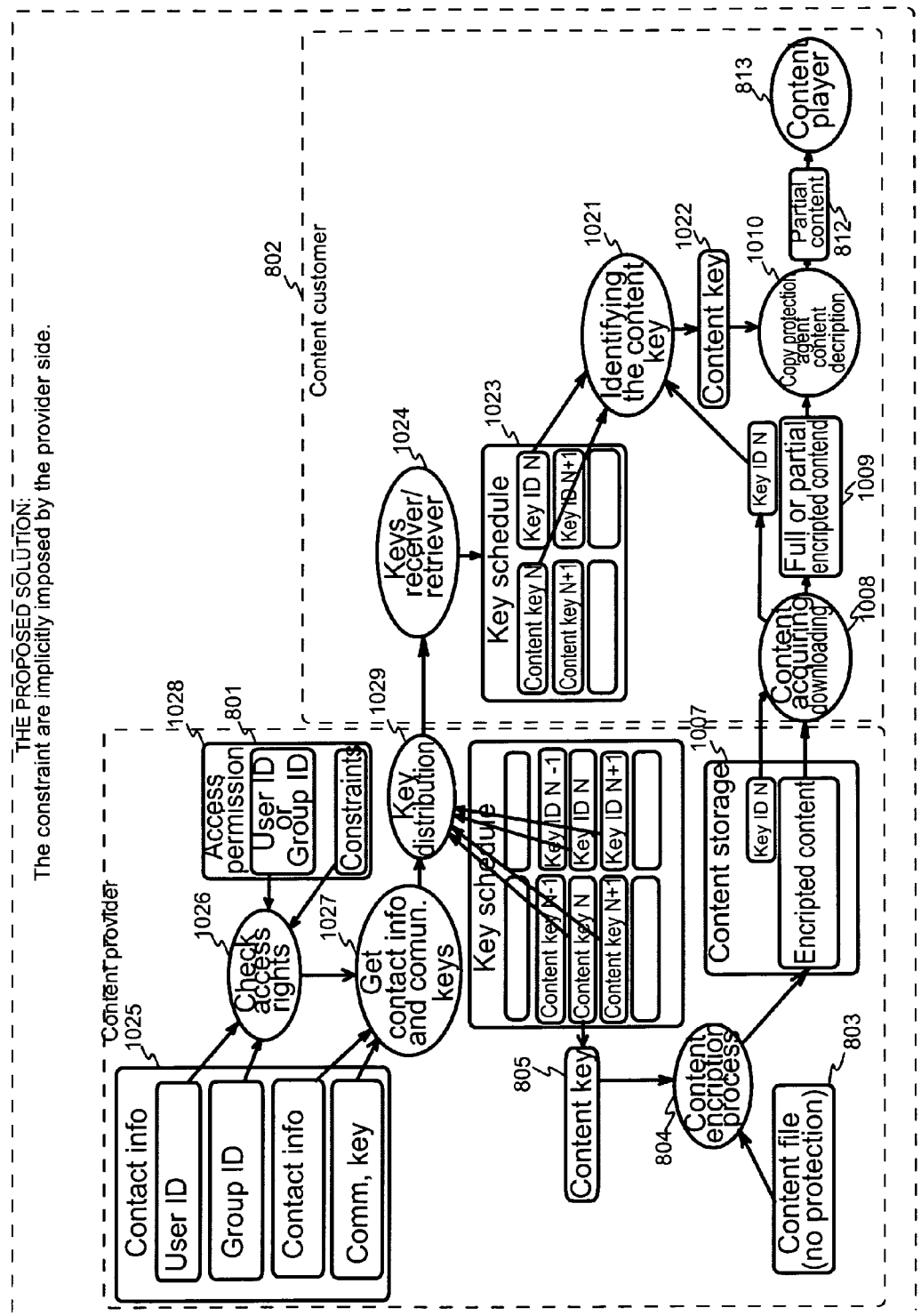
FIG. 12 illustrates yet another exemplary embodiment of a digital rights management (DRM) system.

FIG. 12 illustrates yet another exemplary embodiment of a digital rights management (DRM) system 1000. In this exemplary system, the content is being re-encrypted multiple times with different keys by the content provider 801. As the content access keys change, all the content consumers 802 receive key updates from the content provider 801 as long as the specific content consumers 802 have the right to access the content. In one or more embodiments, the content may be re-encrypted each time when access of a specific content consumer to the content should be revoked or otherwise changed. In another embodiment, the content may be re-encrypted periodically, e.g. once daily, weekly or monthly.

In one or more embodiments, the content provider side 801 of the system 1000 of FIG. 12 incorporates key schedule 1006 designed to accommodate changing content keys. Each key stored in the key schedule 1006 is associated with the corresponding key ID, which is also stored in the content key schedule 1006. Content keys are retrieved from the content key schedule 1006 and distributed to content consumers 802 by the key distribution logic 1029 based on contact information 1025 for the content consumer, consumer's access rights 1026 incorporating access permission 1028, see step 1027.

Once the appropriate content keys are received at 1024 by the content consumer 802, the received content keys are stored in the content schedule 1023. Fully or partially encrypted content 1009 is received by the content consumer 802 at 1008. The content is provided to the content consumer 802 together with the corresponding key ID, which identifies the appropriate content key necessary to decrypt the provided content. The aforesaid content key is retrieved from the content key schedule 1023. After the appropriate content key 1022 has been identified at 1021 based on the content key ID, and retrieved from the content schedule 1023, the copy protection agent 1010 performs decryption of the content 812, which is then played or otherwise displayed or provided to the user.

Copy Protection for Personal DRM

In accordance with an embodiment of the inventive concept, there is provided a method as well as a system implementing such method, configured to identify (by <TODO> means or otherwise) the copy protection implementations (proprietary or open) available on the devices used by another person and/or delivering content key material using a protocol or a representation specific to that copy protection implementation. In one or more embodiments, the copy protection implementations may (or may not) identify themselves to be checked against the content owner/author/publisher preferences or to be checked by any other mean defined by the owner/author/publisher. In one or more embodiments, the content owner/author/publisher may (or may not) identify itself to the copy protection implementation to be checked against the vendor preferences/choices or access restrictions. For instance, the copy protection vendor may charge the authors for providing copy protection to the key material used to protect their content.

Distributed File Storage

Figure 13:
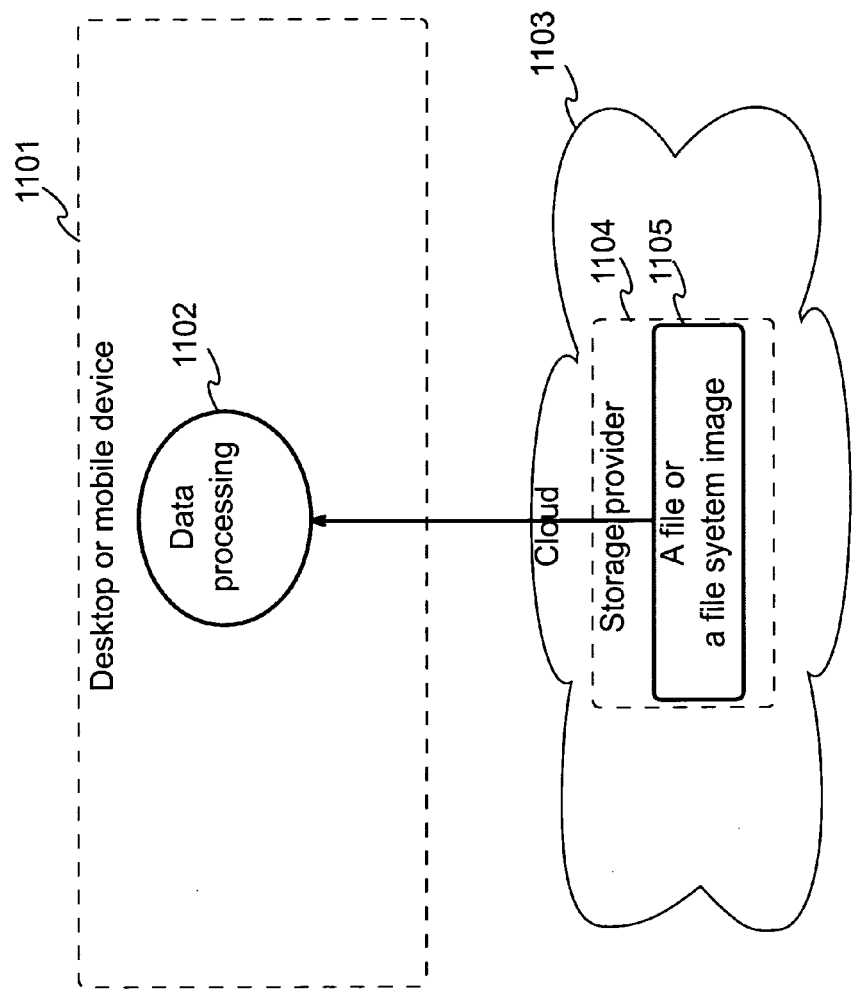
FIG. 13 illustrates a conventional system for cloud-based file storage.

FIG. 13 illustrates a conventional system for cloud-based file storage. The data is stored in a form of a file or a file system image 1105 by a cloud storage provider 1104 in a cloud 1103. The data processing 1102 is performed on the local computer or mobile device 1101. As it would be appreciated by those of skill in the art, both the speed and reliability of data storage depend on one storage provider 1104. The connection bandwidth necessary for this configuration is equal to the size of the data.

Figure 14:
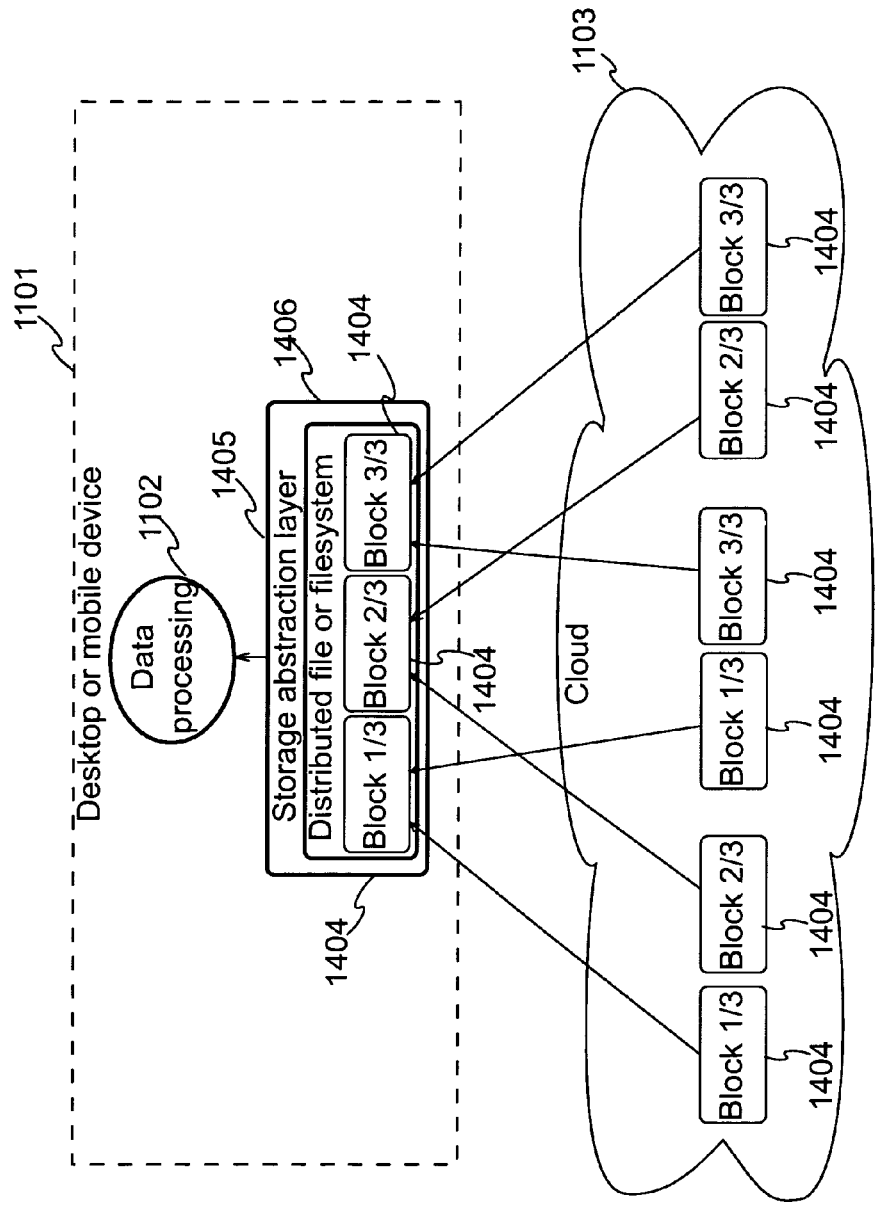
FIG. 14 illustrates an exemplary embodiment of a cloud based storage system for storing user information.

In one or more embodiments of the inventive social networking platform, the user information is stored in an embodiment of a cloud based storage system illustrated in FIG. 14. In the shown storage configuration, user data is subdivided into multiple data blocks 1404, multiple copies of which are stored across the cloud-based storage system 1103. In the embodiment shown in FIG. 14, two copies of each data block are shown. However, as it would be understood by those of skill in the art, any suitable number of data block copies may be used. The user data 1406 is assembled from the stored data blocks 1404 at storage abstraction layer 1405 deployed on the mobile device 1101. As it would be appreciated by those of skill in the art, in the shown configuration, the data access speed is equal to the sum of access speeds for each individual storage provider. In addition, because multiple copies of the data are stored, the reliability of data storage is multiplied accordingly. However, the required bandwidth is the multiple of the data size.

Figure 15:
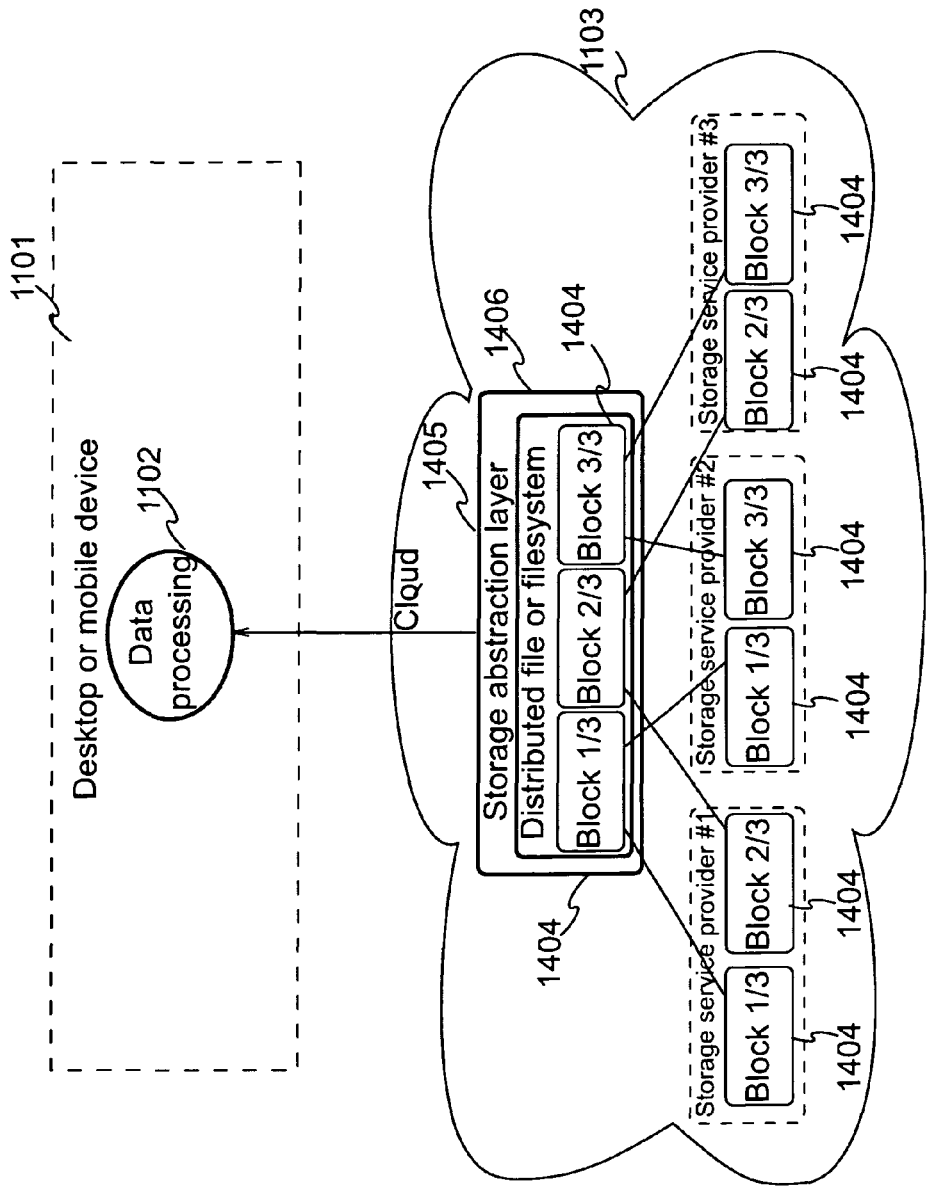
FIG. 15 illustrates an alternative embodiment of the cloud based storage system.

FIG. 15 illustrates an alternative embodiment of the cloud based storage system. In the shown data storage configuration, copies of data blocks are stored across multiple cloud-based storage providers 1107, 1108 and 1109. In addition, the data abstraction layer 1405 is moved into the cloud 1103. Thus, compared with the storage configuration shown in FIG. 14, in the system shown in FIG. 15, the desktop/mobile device connection bandwidth requirement is reduced to the size of the data, while preserving the high access speed and the enhanced reliability of data storage.

Greasemonkey Script or Browser Plugin

As it would be appreciated by those of skill in the art, there exist various email clients with S/MIME support which require configuration and PGP/PKI or other key validation/distribution infrastructure. There also exist browsers, greasemonkey scripts and plugins, which alter mail messages on the fly. For example, such scripts add signatures to email messages such as "Sent from my iPhone". The aforesaid greasemonkey is a browser-side scripting language well-known to persons of skill in the art.

In accordance with one or more embodiments of the invention, there is provided a method and an associated system enabling such method, for transparent (invisible for the user and without any initiative form the user) alteration of the mail (or IM) message in order to protect (encrypt and authenticate) it using personal keys (see above). Such system may run next to the mail or instant messaging client as well as it can be a part or a module of such a client. Such system may also hide or provide an alternative visualization for the control and/or data messages used during personal and/or content key exchanges described above. Such system may (or may not) alter the messages sent to the recipients whose personal keys are not known in order to invite the person to secure communication and/or trigger automatic key exchange with the recipient's key exchange agent with or without recipient's manual approval.

Figure 16:
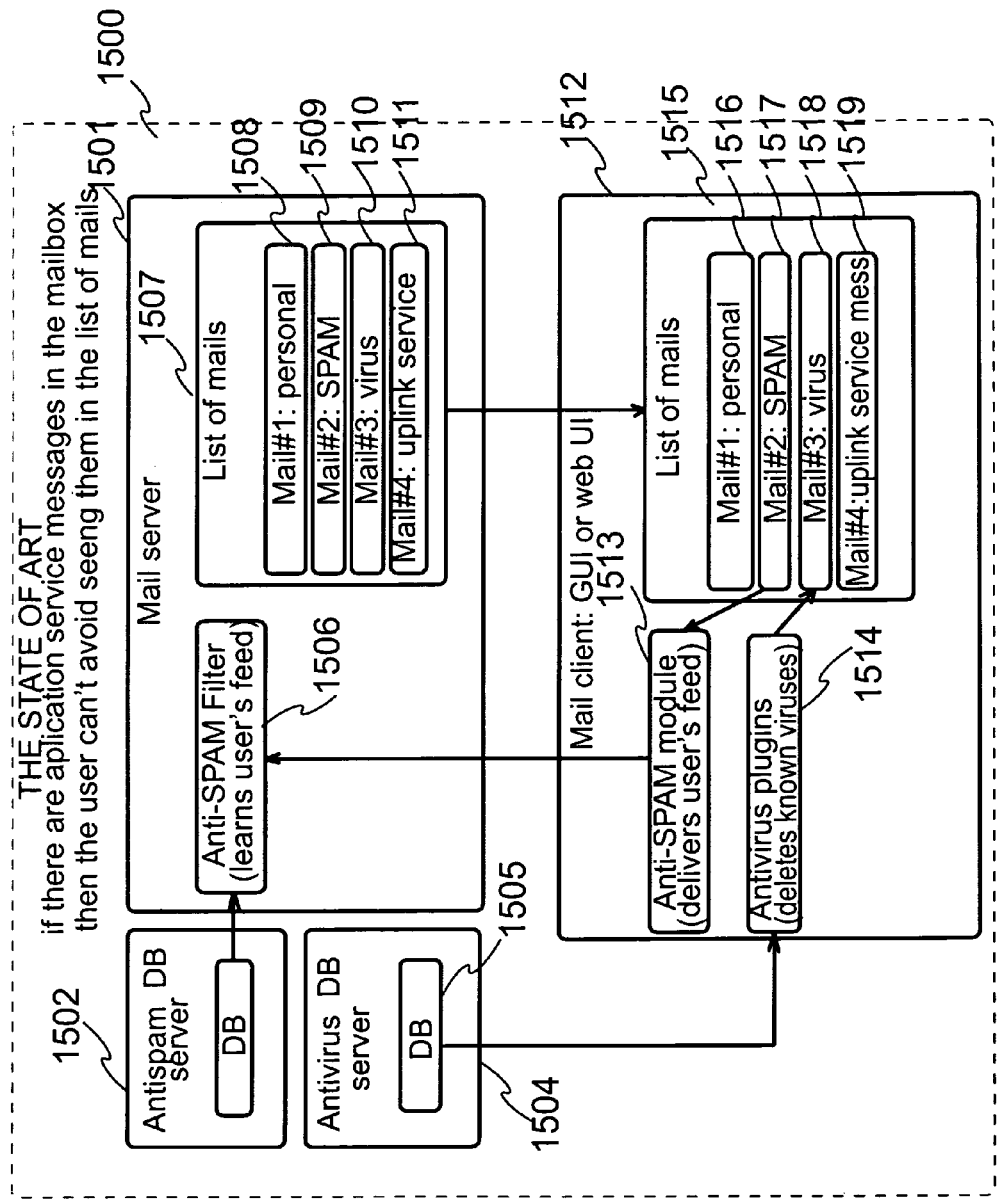
FIG. 16 illustrates an exemplary embodiment of an electronic mail delivery system.

FIG. 16 illustrates an exemplary embodiment of an electronic mail delivery system 1500. The system 1500 incorporates a mail server 1501 as well as mail client 1512 accessed by the user. The mail server 1501 includes a list of emails 1507, which may include emails 1508, 1509, 1510 and 1511. The mail client 1512 is configured to retrieve the email messages 1508-1511 from the email list 1507 of the email server 1501 and store the retrieved messages in its own list 1515, see messages 1516, 1517, 1518 and 1519. Anti-spam module 1506 is provided to filter the incoming email messages based on the information stored in the anti-spam database server 1502 having database 1503. On the client side, the anti-spam module 1513 receives user feedback about particular messages, which is relayed to anti-spam filer 1506. In addition, anti-virus plugin 1514 may be provided for deleting known viruses based on the virus information stored in the database 1505 of the anti-virus database server 1504. As it would be appreciated by those of skill in the art, in the system shown in FIG. 16, if mailbox 115 contains application service messages, the user can't avoid seeing them in the list of other emails.

Figure 17:
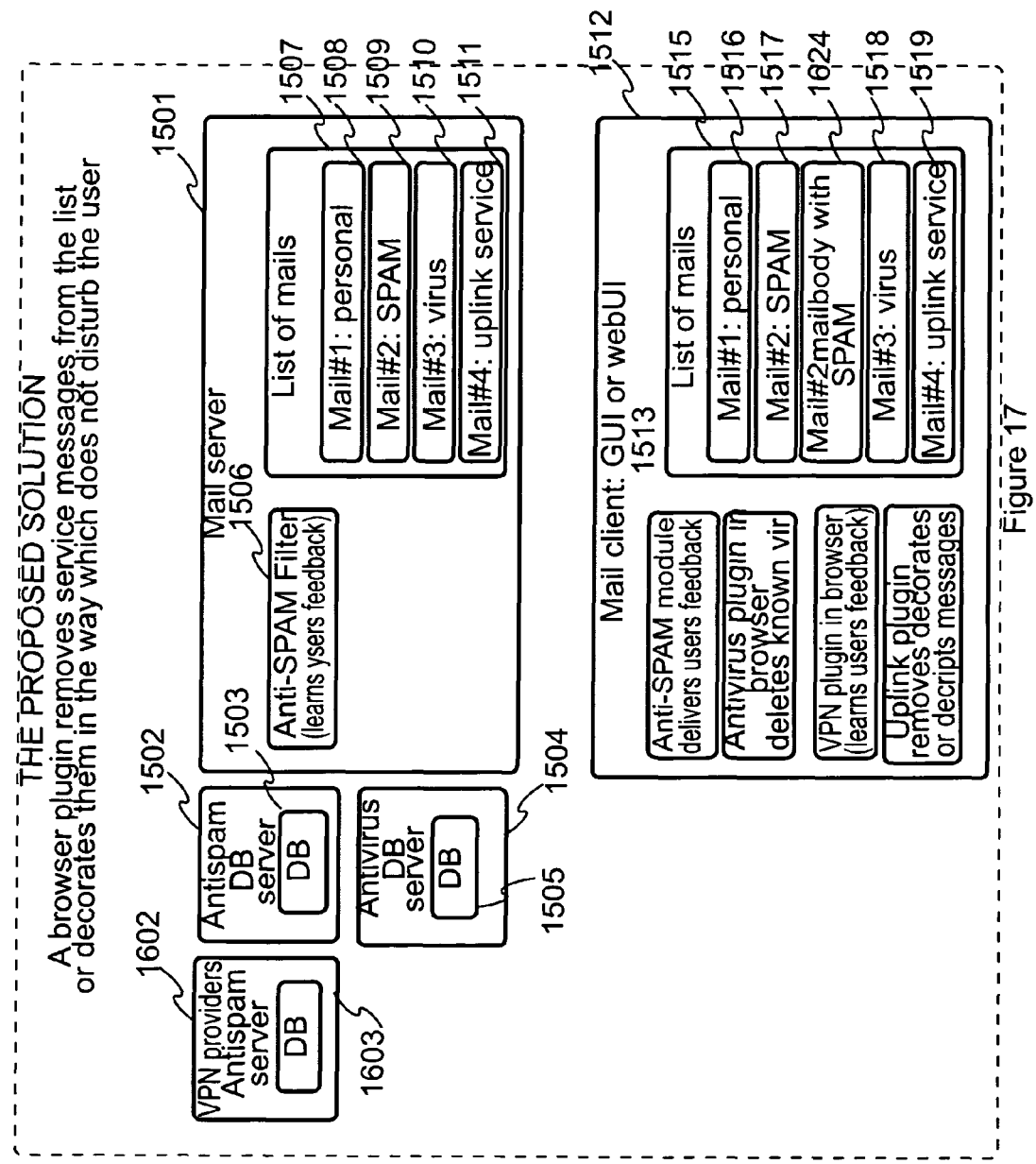
FIG. 17 illustrates another exemplary embodiment of an electronic mail delivery system.

FIG. 17 illustrates another exemplary embodiment of an electronic mail delivery system 1600. In addition to the functionality of the system 1500 shown in FIG. 15, the system 1600 incorporates VPN provider's anti-spam server 1602 having a database 1603, which works in conjunction with VPN plugin 1609 running on the email client 1512. The anti-spam server 1602 performs filtering of the email messages containing spam. This server and plugin help filter spam messages such as message 1517 and substitute it with an email message 1624 with email body having spam deleted. In addition, the mail client 1512 of the system 1600 incorporates uplink plugin 1620 configured to remove, decorate and decrypt service messages, such as uplink service message 1519.

Social Network Application

In accordance with one or more embodiments of the inventive concepts, there is provided a method and an associated system implementing such method, of associating one or more entities of some kind (for example, social network user identifiers) with a personal key mechanisms described above to facilitate access to the content created by personal DRM (see above) from existing social networks or other online resources.

Figure 18:
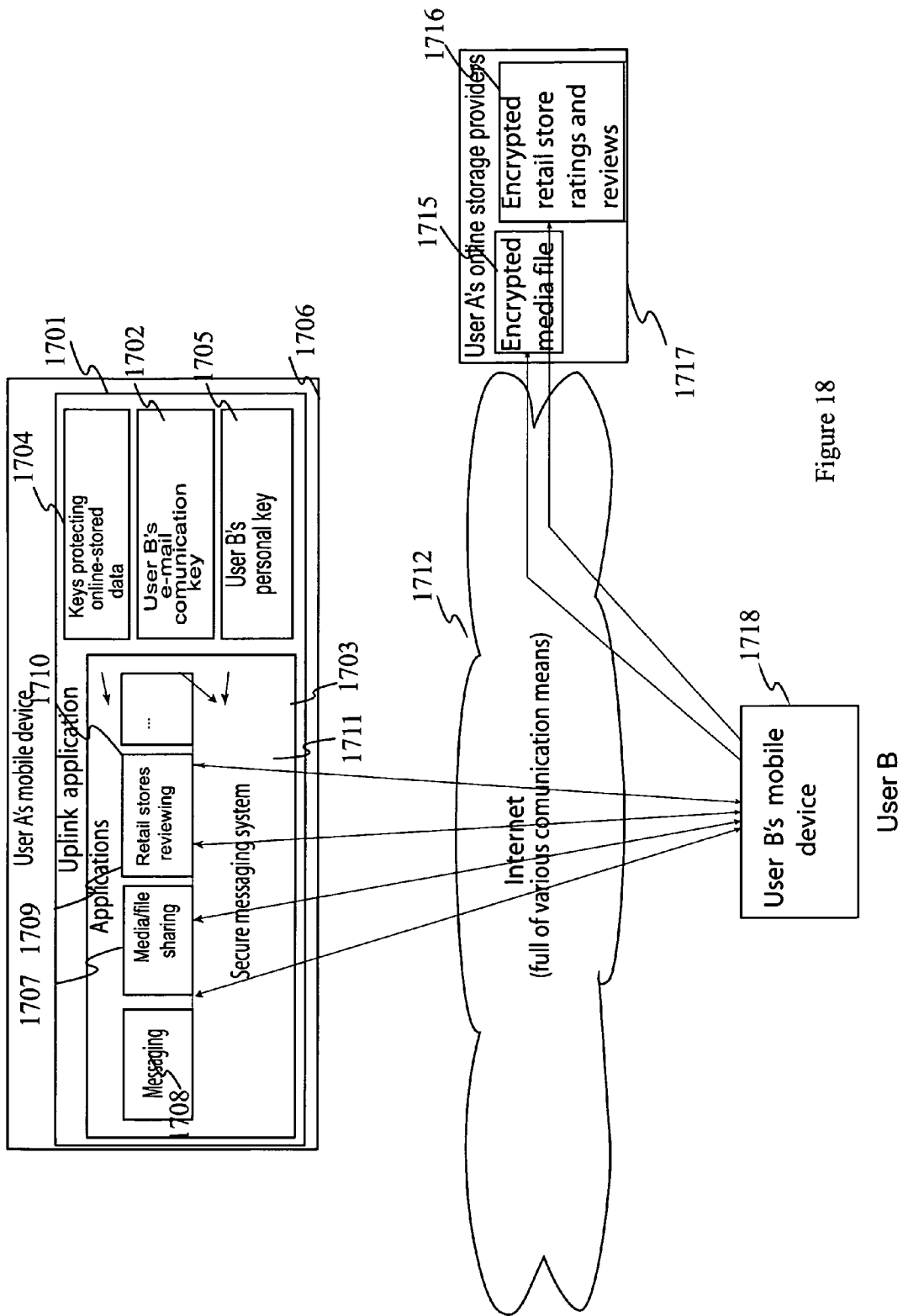
FIG. 18 illustrates an exemplary embodiment of an inventive uplink social networking application.

Specifically, FIG. 18 illustrates an exemplary embodiment of an inventive uplink social networking application. The uplink application 1702 resides on user's mobile device 1701. The application 1702 incorporates application set 1707 including a secure messaging system 1703 as well as messaging application 1708, media/file sharing application 1709 and the retain store rating and review application 1710. As it would be appreciated by those of skill in the art, other applications may be provided on the user's mobile device.

In one or more embodiments, the inventive uplink application includes storage 1704 for storing keys protecting online stored data, other user's (public) communication keys 1705, as well as other user's personal keys 1706. The applications 1708-1710 are configured to communicate with similar applications installed on another user's mobile device 1713 over the Internet 1712. In addition, applications may access encrypted media files 1715, encrypted retail store ratings and reviews 1716 as well as any other information sorted by the user's online storage provider 1714, which may be, in one or more embodiments, a cloud-based storage provider.

Figure 19:
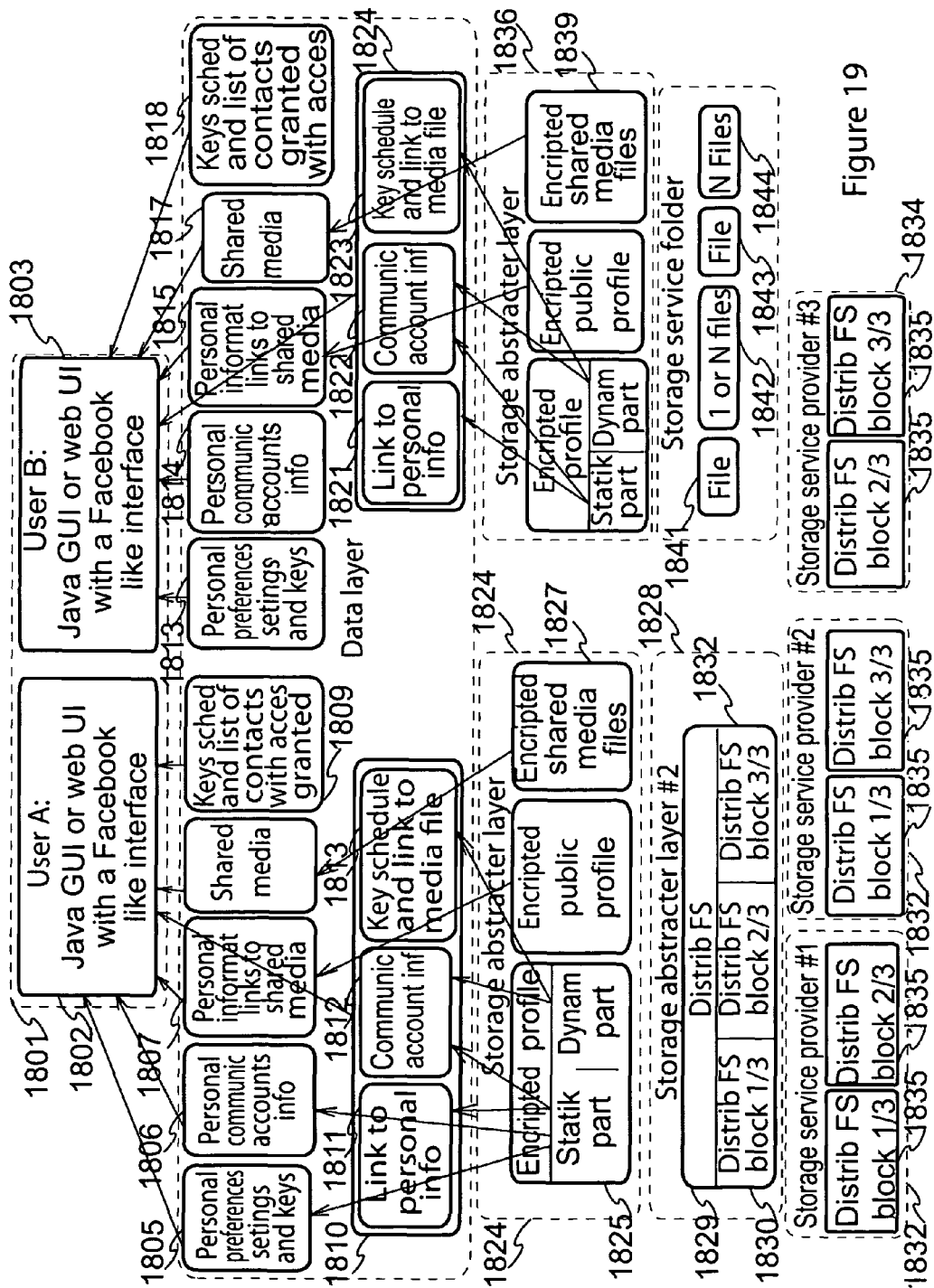
FIG. 19 illustrates an exemplary embodiment of an inventive distributed cloud-based social networking system based on the inventive uplink application as well as other inventive modules and functionality.

FIG. 19 illustrates an exemplary embodiment of an inventive distributed cloud-based social networking system 1800 based on the inventive uplink application as well as other modules and functionality described herein. In one or more embodiments, the presentation layer 1801 consists of Java graphical user interfaces (GUI) or web user interfaces (UI) 1802 and 1803 accessed by user A and user B, respectively. The interfaces 1802 and 1803 are configured to access various data objects disposed in the data layer 1804. Specifically, the data layer 1804 incorporates personal preferences 1805, personal communication account information 1806, personal information and links to shared media 1807, shared media 1808, keys schedules and lists of contacts with access granted to media files 1809, contact information 1810, which may include link to personal information 1811, communication account information 1812 as well as associated key schedule and link to media file 1813. In addition, the data layer of user B may incorporate personal preferences, settings and keys 1814, personal communication account information 1815, personal information and links to shared media 1816, shared media 1817, keys schedules and lists of contacts with access granted to media files 1818, contact information 1820, which may include link to personal information 1821, communication account information 1822 as well as associated key schedule and link to media file 1823.

In one or more embodiments, storage abstraction layer of user A includes encrypted personal profile 1825, which is divided into static and dynamic parts, encrypted public profile 1826 and encrypted shared media files 1827. In one or more embodiment, the division of the data into static and dynamic parts protects the static data from being corrupted due to communication errors during the update of the dynamic data. Second storage abstraction layer 1828 may include distributed file system 1829 consisting of distributed file systems blocks 1830, 1831 and 1832. Multiple copies of such blocks 1835 may be stored by different storage service providers 1832, 1833 and 1834.

In one or more embodiments, storage abstraction layer of user B includes encrypted personal profile 1837, which is divided into static and dynamic parts, encrypted public profile 1838 and encrypted shared media files 1838. Second storage abstraction layer of user B 1840 may consist of files 1841, 1842, 1843 and 1844. In the shown embodiment, files 1841 and 1842 are accessible by user B only, file 1843 is accessible by all who are friends of user B and file 1844 is accessible by friends who belong to the group or circle specifically allowed to access this file. In this context, file is accessible person when the person has the key necessary to decrypt the file.

Exemplary Computer Platform

Figure 20:
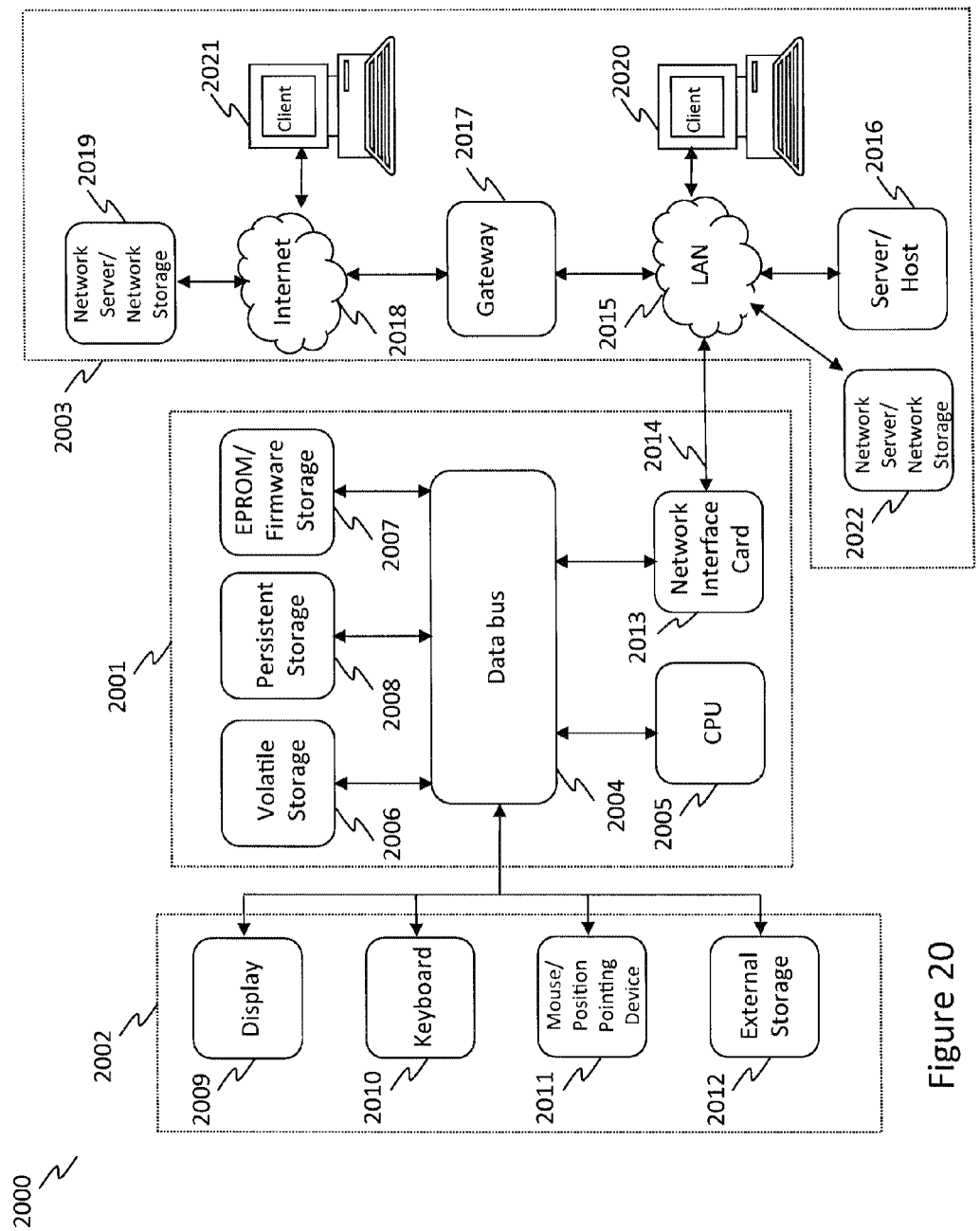
FIG. 20 illustrates an exemplary embodiment of a computer platform upon which the inventive system may be implemented.

FIG. 20 illustrates an exemplary embodiment of a computer platform upon which the inventive system may be implemented. FIG. 20 is a block diagram that illustrates an embodiment of a computer/server system 2000 upon which an embodiment of the inventive methodology may be implemented. The system 2000 includes a computer/server platform 2001, peripheral devices 2002 and network resources 2003.

The computer platform 2001 may include a data bus 2005 or other communication mechanism for communicating information across and among various parts of the computer platform 2001, and a processor 2005 coupled with bus 2001 for processing information and performing other computational and control tasks. Computer platform 2001 also includes a volatile storage 2006, such as a random access memory (RAM) or other dynamic storage device, coupled to bus 2005 for storing various information as well as instructions to be executed by processor 2005. The volatile storage 2006 also may be used for storing temporary variables or other intermediate information during execution of instructions by processor 2005. Computer platform 2001 may further include a read only memory (ROM or EPROM) 2007 or other static storage device coupled to bus 2005 for storing static information and instructions for processor 2005, such as basic input-output system (BIOS), as well as various system configuration parameters. A persistent storage device 2008, such as a magnetic disk, optical disk, or solid-state flash memory device is provided and coupled to bus 2001 for storing information and instructions.

Computer platform 2001 may be coupled via bus 2005 to a display 2009, such as a cathode ray tube (CRT), plasma display, or a liquid crystal display (LCD), for displaying information to a system administrator or user of the computer platform 2001. An input device 2010, including alphanumeric and other keys, is coupled to bus 2001 for communicating information and command selections to processor 2005. Another type of user input device is cursor control device 2011, such as a mouse, a trackball, or cursor direction keys for communicating direction information and command selections to processor 2005 and for controlling cursor movement on display 2009. This input device typically has two degrees of freedom in two axes, a first axis (e.g., x) and a second axis (e.g., y), that allows the device to specify positions in a plane.

An external storage device 2012 may be coupled to the computer platform 2001 via bus 2005 to provide an extra or removable storage capacity for the computer platform 2001. In an embodiment of the computer system 2000, the external removable storage device 2012 may be used to facilitate exchange of data with other computer systems.

The invention is related to the use of computer system 2000 for implementing the techniques described herein. In an embodiment, the inventive system may reside on a machine such as computer platform 2001. According to one embodiment of the invention, the techniques described herein are performed by computer system 2000 in response to processor 2005 executing one or more sequences of one or more instructions contained in the volatile memory 2006. Such instructions may be read into volatile memory 2006 from another computer-readable medium, such as persistent storage device 2008. Execution of the sequences of instructions contained in the volatile memory 2006 causes processor 2005 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 2005 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 2008. Volatile media includes dynamic memory, such as volatile storage 2006.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 2005 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 2005. The bus 2005 carries the data to the volatile storage 2006, from which processor 2005 retrieves and executes the instructions. The instructions received by the volatile memory 2006 may optionally be stored on persistent storage device 2008 either before or after execution by processor 2005. The instructions may also be downloaded into the computer platform 2001 via Internet using a variety of network data communication protocols well known in the art.

The computer platform 2001 also includes a communication interface, such as network interface card 2013 coupled to the data bus 2005. Communication interface 2013 provides a two-way data communication coupling to a network link 2015 that is coupled to a local network 2015. For example, communication interface 2013 may be an integrated services digital network (ISDN) card or a modem to provide a data communication connection to a corresponding type of telephone line. As another example, communication interface 2013 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 2013 sends and receives electrical, electromagnetic or optical signals that carry digital data streams representing various types of information.

Network link 2013 typically provides data communication through one or more networks to other network resources. For example, network link 2015 may provide a connection through local network 2015 to a host computer 2016, or a network storage/server 2017. Additionally or alternatively, the network link 2013 may connect through gateway/firewall 2017 to the wide-area or global network 2018, such as an Internet. Thus, the computer platform 2001 can access network resources located anywhere on the Internet 2018, such as a remote network storage/server 2019. On the other hand, the computer platform 2001 may also be accessed by clients located anywhere on the local area network 2015 and/or the Internet 2018. The network clients 2020 and 2021 may themselves be implemented based on the computer platform similar to the platform 2001.

Local network 2015 and the Internet 2018 both use electrical, electromagnetic or optical signals that carry digital data streams. The signals through the various networks and the signals on network link 2015 and through communication interface 2013, which carry the digital data to and from computer platform 2001, are exemplary forms of carrier waves transporting the information.

Computer platform 2001 can send messages and receive data, including program code, through the variety of network (s) including Internet 2018 and LAN 2015, network link 2015 and communication interface 2013. In the Internet example, when the system 2001 acts as a network server, it might transmit a requested code or data for an application program running on client(s) 2020 and/or 2021 through Internet 2018, gateway/firewall 2017, local area network 2015 and communication interface 2013. Similarly, it may receive code from other network resources.

The received code may be executed by processor 2005 as it is received, and/or stored in persistent or volatile storage devices 2008 and 2006, respectively, or other non-volatile storage for later execution.

It should be noted that the present invention is not limited to any specific firewall system. The inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the system for enabling a distributed computerized infrastructure for establishing a social network. It is intended that the specification and examples be considered as exemplary only, with a true scope and spirit of the invention being indicated by the following claims.

What is claimed is:

1. A computer-implemented method for storing a content, the stored content being accessible by a computerized system comprising at least one central processing unit, a memory, a storage system and a network interface unit, the computerized system being accessible by a user, the method comprising:
    a. Generating a first cryptographic key;
    b. Encrypting the content with the first cryptographic key;
    c. Storing the encrypted content in a data storage system, the data storage system comprising at least one data storage medium; a data storage controller and a network interface module, the data storage system being a part of a cloud-based distributed storage system, the cloud based storage system being connected via a data network with the computerized system accessible by the user;
    d. Generating a second cryptographic key;
    e. Re-encrypting the content with the second cryptographic key and storing the re-encrypted content in the data storage system, wherein the re-encryption of the content is performed within the cloud-based distributed storage system and wherein the second cryptographic key is generated and the re-encryption is performed periodically; and
    f. distributing, via the data network, the first cryptographic key between a first plurality of users and distributing the generated second cryptographic key between a second plurality of users, the first plurality of users being different from the second plurality of users.

2. The computer-implemented method of claim 1, wherein at least the second cryptographic key is generated on the computerized system accessible by the user and wherein the generated second cryptographic key is transmitted from the computerized system to the cloud-based distributed storage system.

3. The computer-implemented method of claim 1, wherein the second cryptographic key is generated based on the first cryptographic key.

4. The computer-implemented method of claim 1, wherein the second cryptographic key is generated and the re-encryption is performed when access rights with respect to the content of at least one other user change.

5. The computer-implemented method of claim 1, wherein at least the second cryptographic key is generated within the cloud-based distributed storage system.

6. A computerized content storage system for storing a content, the stored content being accessible by a computerized system comprising at least one central processing unit, a memory, a storage system and a network interface unit, the computerized system being accessible by a user, the computerized content storage system comprising:
    a. Key generation module for generating a first cryptographic key and a second cryptographic key;
    b. Encryption module for encrypting the content with the first cryptographic key; and
    c. A data storage system for storing the encrypted content, the data storage system comprising at least one data storage medium; a data storage controller and a network interface module, the data storage system being a part of a cloud-based distributed storage system, the cloud based storage system being connected via a data network with the computerized system accessible by the user, wherein the encryption module is configured to re-encrypt the content with the second cryptographic key and cause the re-encrypted content to be stored in the data storage system, wherein the encryption module is located within the cloud based storage system and wherein the second cryptographic key is generated and the re-encryption is performed periodically and wherein the first cryptographic key is distributed between a first plurality of users and the generated second cryptographic key is distributed between a second plurality of users, the first plurality of users being different from the second plurality of users.

7. The computerized content storage system of claim 6, wherein the key generation module is disposed on the computerized system accessible by the user and wherein the generated second cryptographic key is transmitted from the computerized system to the cloud-based distributed storage system.

8. The computerized content storage system of claim 6, wherein the second cryptographic key is generated based on the first cryptographic key.

9. The computerized content storage system of claim 6, wherein the second cryptographic key is generated and the re-encryption is performed when access rights with respect to the content of at least one other user change.

10. The computerized content storage system of claim 6, wherein the key generation module is disposed within the cloud-based distributed storage system.

11. A tangible computer-readable medium embodying a set of computer-readable instructions, which, when executed by one or more processors cause the one or more processors to perform a computer-implemented method for storing a content, the stored content being accessible by a computerized system comprising at least one central processing unit, a memory, a storage system and a network interface unit, the computerized system being accessible by a user, the method comprising:

a. Generating a first cryptographic key;

b. Encrypting the content with the first cryptographic key;

c. Storing the encrypted content in a data storage system, the data storage system comprising at least one data storage medium; a data storage controller and a network interface module, the data storage system being a part of a cloud-based distributed storage system, the cloud based storage system being connected via a data network with the computerized system accessible by the user;

d. Generating a second cryptographic key;

e. Re-encrypting the content with the second cryptographic key and storing the re-encrypted content in the data storage system, wherein the re-encryption of the content is performed within the cloud-based distributed storage system and wherein the second cryptographic key is generated and the re-encryption is performed periodically; and f. distributing, via the data network, the first cryptographic key between a first plurality of users and distributing the generated second cryptographic key between a second plurality of users, the first plurality of users being different from the second plurality of users.

12. The tangible computer-readable medium of claim 11, wherein at least the second cryptographic key is generated on the computerized system accessible by the user and wherein the generated second cryptographic key is transmitted from the computerized system to the cloud-based distributed storage system.

13. The tangible computer-readable medium of claim 11, wherein the second cryptographic key is generated based on the first cryptographic key.

14. The tangible computer-readable medium of claim 11, wherein the second cryptographic key is generated and the re-encryption is performed when access rights with respect to the content of at least one other user change.

\* \* \* \* \*